United States Patent
Saji

(10) Patent No.: US 9,893,546 B2
(45) Date of Patent: Feb. 13, 2018

(54) DIRECT CURRENT POWER SUPPLY CIRCUIT

(71) Applicant: Panasonic Intellectual Property Management Co., Ltd., Osaka (JP)

(72) Inventor: Takashi Saji, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 14/882,519

(22) Filed: Oct. 14, 2015

(65) Prior Publication Data

US 2016/0036249 A1 Feb. 4, 2016

Related U.S. Application Data

(63) Continuation of application No. PCT/JP2014/002644, filed on May 20, 2014.

(30) Foreign Application Priority Data

May 20, 2013 (JP) ................................. 2013-105804

(51) Int. Cl.
  *H02J 7/16* (2006.01)
  *H02J 7/00* (2006.01)
  (Continued)

(52) U.S. Cl.
  CPC ............ *H02J 7/007* (2013.01); *H02J 7/0052* (2013.01); *H02M 3/33507* (2013.01); *H02M 7/2176* (2013.01)

(58) Field of Classification Search
  CPC ..................................................... H02J 7/007
  (Continued)

(56) References Cited

U.S. PATENT DOCUMENTS

| 8,184,459 B2 * | 5/2012 | Fujii | ....................... | H02M 1/10 323/284 |
| 8,942,016 B2 * | 1/2015 | Nate | ................... | H02M 1/4225 323/266 |

(Continued)

FOREIGN PATENT DOCUMENTS

| DE | 3501519 A1 | 8/1986 |
| JP | 61-206016 | 9/1986 |

(Continued)

OTHER PUBLICATIONS

International Search Report of PCT application No. PCT/JP2014/002644 dated Jul. 15, 2014.

(Continued)

*Primary Examiner* — Richard V Muralidar
(74) *Attorney, Agent, or Firm* — McDermott Will & Emery LLP

(57) ABSTRACT

A direct current power supply circuit includes an alternating-current power supply; a rectification circuit for generating a direct-current voltage from an alternating-current voltage; a charging switch having an input terminal connected to the rectification circuit, the charging switch outputting an output voltage according to an input value input to a control terminal; a capacitor and a control circuit, which are connected to an output terminal; and a charging switch control circuit for generating a switch-on signal when the output voltage is equal to or lower than a first reference voltage value, and for generating a switch-off signal when the output voltage is equal to or higher than a second reference voltage value higher than the first reference voltage value, wherein a charging period setting circuit including at least one of the rectification circuit and the charging switch control circuit sets a charging period in which a charging current flows into the capacitor and a non-charging period in which the charging current does not flow, and in a case where the switch-on (Continued)

signal is generated during the charging period, the charging current flows through the charging switch when the direct-current voltage becomes equal to or higher than the output voltage, and in a case where the switch-on signal is generated during the non-charging period, the charging current does not flow through the charging switch even if the direct-current voltage becomes equal to or higher than the output voltage.

18 Claims, 27 Drawing Sheets

(51) Int. Cl.
    *H02M 3/335* (2006.01)
    *H02M 7/217* (2006.01)
(58) Field of Classification Search
    USPC .................................................. 320/145, 160
    See application file for complete search history.

(56) References Cited

U.S. PATENT DOCUMENTS

| | | | | |
|---|---|---|---|---|
| 9,240,727 | B2* | 1/2016 | Sugawara | H02M 3/33507 |
| 9,425,678 | B2* | 8/2016 | Saji | H02M 1/36 |
| 9,577,511 | B2* | 2/2017 | Nate | H02M 1/4225 |
| 2010/0085776 | A1 | 4/2010 | Mimura | |
| 2012/0014145 | A1 | 1/2012 | Koike | |

FOREIGN PATENT DOCUMENTS

| | | |
|---|---|---|
| JP | 2010-093922 | 4/2010 |
| JP | 2011-244602 | 12/2011 |
| JP | 2012-023832 | 2/2012 |
| JP | 2012-105505 | 5/2012 |

OTHER PUBLICATIONS

English Translation of Chinese Search Report dated Aug. 14, 2017 for the related Chinese Patent Application No. 201480028830.3.

* cited by examiner

DIRECT CURRENT POWER SUPPLY CIRCUIT

RELATED APPLICATIONS

This application is a Continuation of International Application No. PCT/JP2014/002644, filed on May 20, 2014, which in turn claims priority from Japanese Patent Application No. 2013-105804, filed on May 20, 2013, the contents of all of which are incorporated herein by reference in their entireties.

BACKGROUND

1. Field of the Invention

The present disclosure relates to a direct current power supply circuit.

2. Description of the Related Art

Switching power supply devices have widely been used for electronic devices such as home electric appliances or business machines for improving power conversion efficiency. Such power supply devices include semiconductor devices that utilize a switching operation by a semiconductor (a switching element such as a transistor) to control an output voltage.

Recently, it has attracted attention to a reduction in power consumption of these electronic devices upon a stand-by mode, and this trend generates a great demand for a switching power supply device that enables the reduction in power consumption upon a stand-by mode. Reduction in electric power supplied to a control circuit in a switching power supply device is effective way for reducing power consumption upon a stand-by mode.

A series-regulator direct current power supply circuit which acquires a direct-current voltage from an alternating-current voltage of a commercial power supply is often used to supply electric power to the control circuit in the switching power supply device. However, a voltage of a commercial power supply is an extremely high alternating-current voltage such as AC 100 V to 240 V, relative to a direct-current voltage of DC 5 V to 24 V needed for the control circuit. Therefore, a power loss of the direct current power supply circuit might be increased.

As a method of reducing a power loss of a direct current power supply circuit, a method has been proposed in which a full-wave rectification is performed after an alternating-current voltage from a commercial power supply is lowered with a transformer, and the resultant is converted into a direct-current voltage (see, for example, Unexamined Japanese Patent Publication No. S61-206016). As another method, there has been proposed a method in which it is detected that a rectified voltage formed by rectifying an alternating-current voltage from a commercial power supply becomes equal to or less than a first voltage, and a capacitor connected to a power supply terminal of a control circuit is charged during a period till the rectified voltage is inverted from 0 V and exceeds the first voltage to be equal to or larger than a second voltage (see, for example, Unexamined Japanese Patent Publication No. 2011-244602).

SUMMARY

A direct current power supply circuit according the present disclosure includes: an alternating-current power supply; a rectification circuit for rectifying an alternating-current signal of the alternating-current power supply to generate a direct-current voltage; a first charging switch having a first input terminal connected to the rectification circuit, a first control terminal, and a first output terminal, the first charging switch outputting a first output voltage to the first output terminal according to a first input value input to the first control terminal; a first capacitor and a first control circuit, which are connected to the first output terminal; and a first charging switch control circuit connected to the first control terminal, wherein the first charging switch control circuit generates a switch-on signal for turning on the first charging switch when the first output voltage is equal to or lower than a first reference voltage value, and generates a switch-off signal for turning off the first charging switch when the first output voltage is equal to or higher than a second reference voltage value higher than the first reference voltage value, a charging period setting circuit, which includes at least one of the rectification circuit and the first charging switch control circuit, sets a charging period in which a charging current flows into the first capacitor through the first charging switch and a non-charging period in which the charging current does not flow, in synchronism with the alternating-current signal, and in the case where the switch-on signal is generated during the charging period, the charging current flows through the first charging switch when the direct-current voltage becomes equal to or higher than the first output voltage, and in the case where the switch-on signal is generated during the non-charging period, the charging current does not flow through the first charging switch even if the direct-current voltage becomes equal to or higher than the first output voltage, while the charging current flows through the first charging switch when an operation enters a next charging period and yet the direct-current voltage becomes equal to or higher than the first output voltage.

The direct current power supply circuit according to this features of the present disclosure can easily reduce power supplied to a control circuit such as a switching power supply device.

The direct current power supply circuit may also be configured such that the charging period setting circuit includes the rectification circuit constituted from a half-wave rectification circuit, wherein one of a period in which the alternating-current signal has a positive value and a period in which the alternating-current signal has a negative value is set as the charging period, and a remaining period is set as the non-charging period.

The direct current power supply circuit according to this features of the present disclosure can easily reduce power supplied to a control circuit such as a switching power supply device without monitoring a direct-current voltage.

The direct current power supply circuit may also be configured such that the charging period setting circuit includes the rectification circuit constituted from a full-wave rectification circuit, and a charging inhibition signal generation circuit, which is connected to the alternating-current power supply, for generating a charging inhibition signal to control not to generate the switch-on signal, which is activated during a period in which the alternating-current signal has a positive value or a period in which the alternating-current signal has a negative value, wherein the non-charging period is set, when the charging inhibition signal is activated, and the charging period is set, when the charging inhibition signal is deactivated.

The direct current power supply circuit according to this feature of the present disclosure can easily reduce power supplied to a control circuit such as a switching power supply device, even if the direct-current voltage is a full-wave rectified voltage.

The direct current power supply circuit may also be configured such that the charging inhibition signal is generated from a signal acquired by applying a half-wave rectification to the alternating-current signal.

The direct current power supply circuit according to this feature of the present disclosure can further reduce a power loss compared to the case in which the charging inhibition signal is generated from a full-wave rectified voltage.

The direct current power supply circuit may also be configured such that the charging period setting circuit includes the rectification circuit constituted from a half-wave rectification circuit or a full-wave rectification circuit, the first charging switch control circuit, and a hysteresis control signal generation circuit, which is connected to the alternating-current power supply, for generating a hysteresis control signal which is activated during a predetermined period shorter than a cycle of the alternating-current power supply, when the direct-current voltage becomes equal to or lower than a predetermined voltage value which is equal to or lower than an average of absolute values of voltages of the alternating-current signal, wherein: a period during which the hysteresis control signal is activated is set to the charging period, and the first reference voltage value is changed to a third reference voltage value equal to or lower than the second reference voltage value, and a period during which the hysteresis control signal is deactivated is set to the non-charging period, and the first output voltage does not become equal to or lower than the first reference voltage value.

The direct current power supply circuit according to this feature of the present disclosure can increase the range of setting the capacitance of the first capacitor.

The direct current power supply circuit may also be configured such that the hysteresis control signal is generated from a signal acquired by applying a half-wave rectification to the alternating-current signal.

The direct current power supply circuit according to this feature of the present disclosure can further reduce a power loss compared to the case in which the hysteresis control signal is generated from a full-wave rectified voltage.

The direct current power supply circuit may also be configured such that the first control circuit has operation modes including a normal power mode and a low-power mode, which are switched based on a mode switching signal, and during a period in which the mode switching signal corresponds to the low-power mode, the first reference voltage value is changed to a fourth reference voltage value equal to or lower than the second reference voltage value.

The direct current power supply circuit according to this feature of the present disclosure can respond to the change in the circuit current due to a mode switching, thereby being easily applied to control circuits with various specifications.

The direct current power supply circuit may also be configured to include a second charging switch having a second input terminal connected to a rectification circuit, a second control terminal, and a second output voltage, the second charging switch outputting a second output voltage to the second output terminal according to a second input value input to the second control terminal, a second capacitor and a second control circuit, which are connected to the second output terminal, and a second charging switch control circuit connected to the second control terminal, wherein the second control circuit has a normal power mode and a low-power mode, which are switched based on a mode switching signal, and during a period in which the mode switching signal corresponds to the low-power mode, the second control circuit inhibits the second charging switch from being turned on.

The direct current power supply circuit according to this feature of the present disclosure can respond to the change in the circuit current due to a mode switching in the case where the direct current power supply circuit includes two power supply voltage terminals, thereby being easily applied to control circuits with various specifications.

In addition, the direct current power supply circuit according to this feature of the present disclosure can easily reduce power supplied to a control circuit such as a switching power supply device without causing increase in cost or malfunction in an abnormal state.

DETAILED DESCRIPTION OF THE PREFERRED EMBODIMENTS

However, the conventional direct current power supply circuit described in Unexamined Japanese Patent Publication No. S61-206016 entails an increase in size or an increase in cost of a switching power supply device, because it uses a transformer for lowering an alternating-current voltage from a commercial power supply.

Figure 2:
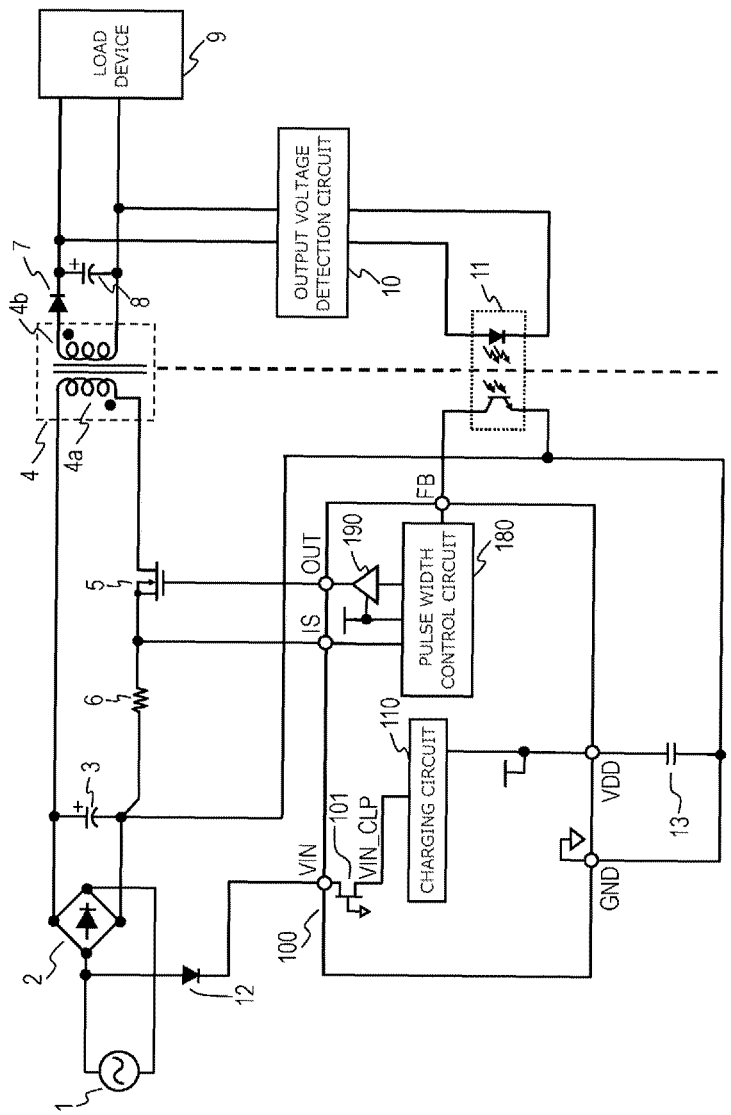
FIG. 2 is a circuit diagram illustrating one configuration of a switching power supply device including the direct current power supply circuit according to the first exemplary embodiment.

In the direct current power supply circuit illustrated in FIG. 2 of Unexamined Japanese Patent Publication No. 2011-244602, power consumption for monitoring a rectified voltage might occur even during the period in which a power supply to the control circuit is stopped. The smaller the consumption current of the entire control circuit becomes, the more the power consumption becomes non-negligible. In addition, since the power supply period is restricted, the capacitor cannot immediately be charged when a power supply terminal voltage is abnormally decreased due to an increase in the consumption current of the control circuit.

With this, the power supply terminal voltage becomes lower than an operation stop voltage, which might cause malfunction. On the other hand, when a direct current power supply circuit is designed in consideration of an abnormal decrease in the power supply terminal voltage described above, the second voltage has to be set to be sufficiently high, or the capacitance of the capacitor has to be set larger. However, this might cause restriction by the maximum rated voltage of the power supply terminal, or increase in the size and cost of the capacitor.

The present disclosure provides a direct current power supply circuit that can reduce power supplied to a control circuit such as a switching power supply device.

A semiconductor device according to the present disclosure will be described below with reference to the drawings. However, detailed descriptions more than necessary will sometimes be not given. For example, detailed descriptions for matters which have already been well known in the art and redundant descriptions for substantially the same configurations will sometimes be not given. This is to facilitate understanding of a person skilled in the art by preventing unnecessarily redundant descriptions.

Note that the accompanying drawings and the following description are provided in order for a person of ordinary skill in the art to sufficiently understand the present disclosure, and they are not intended to limit the subject matter set forth in the claims.

First Exemplary Embodiment

A direct current power supply circuit according to a first exemplary embodiment and a switching power supply device including the direct current power supply circuit will specifically be described below with reference to FIGS. 1 to 6.

Figure 1:
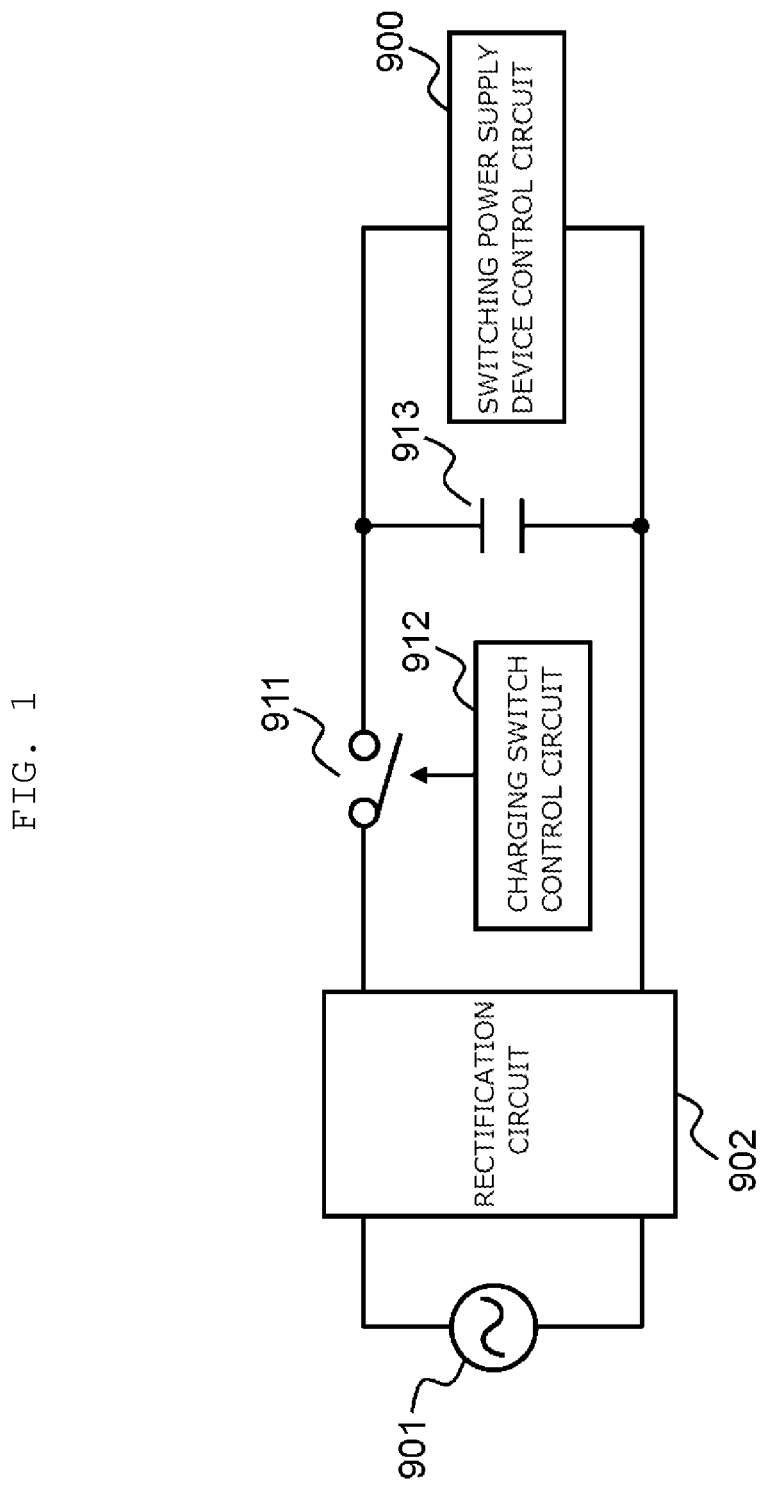
FIG. 1 is a block diagram schematically illustrating a direct current power supply circuit according to a first exemplary embodiment.

FIG. 1 is a block diagram schematically illustrating a direct current power supply circuit according to the first exemplary embodiment.

As illustrated in FIG. 1, an alternating-current voltage from commercial power supply 901 is applied to charging switch 911 through rectification circuit 902 as an input direct-current voltage. Charging switch 911 is controlled by charging switch control circuit (hereinafter referred to as CSWC circuit) 912, and supplies power to smoothing capacitor 913 and switching power supply device control circuit 900 during the period in which charging switch 911 is turned on. During the period in which charging switch 911 is turned off, smoothing capacitor 913 supplies power to switching power supply device control circuit 900.

The switching power supply device including the direct current power supply circuit according to the first exemplary embodiment will next be described.

FIG. 2 is a circuit diagram illustrating one configuration of the switching power supply device including the direct current power supply circuit according to the first exemplary embodiment.

In FIG. 2, a bridge diode 2 for rectifying an alternating-current voltage is connected to commercial power supply 1, and smoothing capacitor 3 and primary coil 4a of transformer 4 for power conversion are connected to bridge diode 2.

Transformer 4 has primary coil 4a and secondary coil 4b. Primary coil 4a and secondary coil 4b are opposite in polarity to each other. This switching power supply device is of a flyback type. Switching element 5 is connected to primary coil 4a. An on/off switching control is performed by OUT terminal output signal of switching control circuit (hereinafter referred to as SWC circuit) 100. Rectification diode 7 and smoothing capacitor 8 are connected to secondary coil 4b. A flyback voltage appearing on secondary coil 4b with the switching operation is rectified and smoothed to generate an output voltage, and power is supplied to load device 9.

SWC circuit 100 is a semiconductor device controlling switching element 5, and includes six terminals, which are a VIN terminal, a VDD terminal, an OUT terminal, a FB terminal, an IS terminal, and a GND terminal, as external input/output terminals. SWC circuit 100 also includes junction field effect transistor (JFET) 101, charging circuit 110, pulse width control circuit (hereinafter referred to as PLSWC circuit) 180, and drive circuit 190, for example.

The VIN terminal is a terminal for supplying power to SWC circuit 100. A half-wave rectified voltage is applied to the VIN terminal from commercial power supply 1 through rectification diode 12 as an input direct-current voltage. Specifically, rectification circuit 902 is a half-wave rectification circuit. An alternating-current voltage from commercial power supply 1 is a high voltage of AC 100 V to 240 V. Therefore, JFET 101 with the maximum rated voltage of 500 V is connected, for example. When an input voltage equal to or higher than 50 V is input, JFET 101 outputs a voltage clamped to 50 V, and the output voltage is input to charging circuit 110 as input clamp voltage signal VIN_CLP.

The VDD terminal is a power supply voltage terminal of SWC circuit 100. Smoothing capacitor 13 is connected to the VDD terminal. The VDD terminal is a terminal capable of stably supplying power to SWC circuit 100 without causing a VDD terminal voltage to be reduced to an operating stop voltage.

The OUT terminal is a terminal connected to a control terminal (gate) of switching element 5. A control signal from PLSWC circuit 180 is output to switching element 5 via drive circuit 190.

The FB terminal receives a feedback signal output from output voltage detection circuit 10 via photocoupler 11 to control the switching operation.

The IS terminal is a terminal for monitoring a current flowing through switching element 5. A signal converted into a voltage by resistor 6 is input to the IS terminal.

The GND terminal is connected to a low-potential side of smoothing capacitor 3, and becomes a voltage reference for a primary side.

Figure 3:
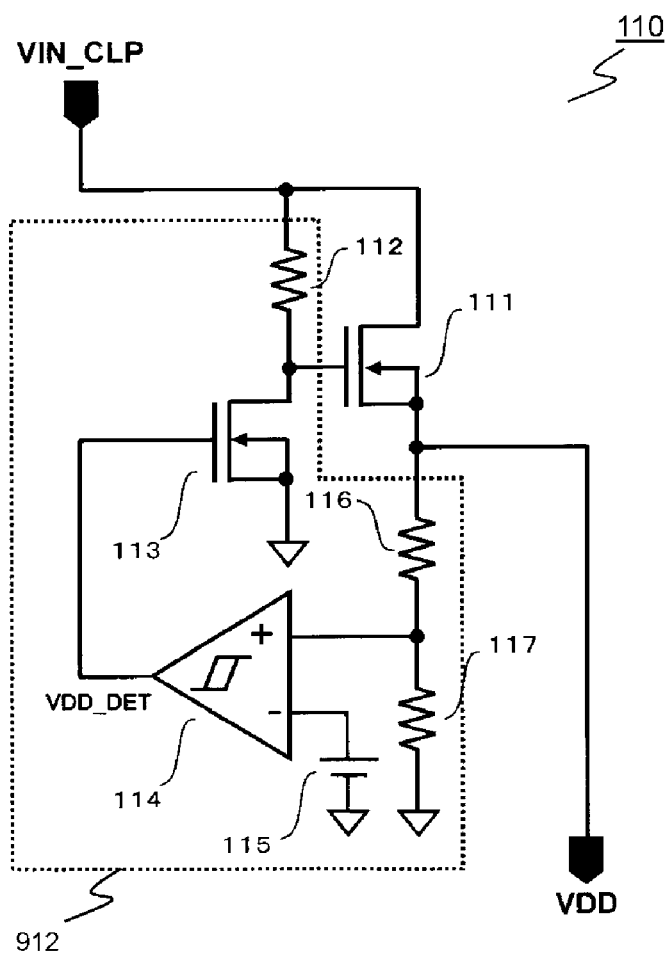
FIG. 3 is a circuit diagram illustrating one configuration of a charging circuit according to the first exemplary embodiment.

Charging circuit 110 receives input clamp voltage signal VIN_CLP, and supplies power to SWC circuit 100 and smoothing capacitor 13 connected to the VDD terminal. For example, charging circuit 110 includes N-type MOSFETs 111 and 113, resistors 112, 116, and 117, comparator with hysteresis (hereinafter referred to as HYS comparator) 114, and reference voltage source 115 as illustrated in FIG. 3, and has functions corresponding to charging switch 911 and CSWC circuit 912 in FIG. 1.

PLSWC circuit 180 outputs a signal for controlling switching element 5 to drive circuit 190 based on signals from the FB terminal and the IS terminal.

Output voltage detection circuit 10 is connected to both ends of smoothing capacitor 8 at the secondary side, and generates a feedback signal according to a value of an output voltage applied to load device 9.

The operation of switching power supply device thus configured in FIG. 2 will be described.

When an alternating-current voltage is input from commercial power supply 1, a direct-current voltage rectified and smoothed by bridge diode 2 and smoothing capacitor 3 is applied to primary coil 4a of transformer 4, switching element 5, and resistor 6. On the other hand, a half-wave rectified voltage rectified by rectification diode 12 is applied to the VIN terminal of SWC circuit 100, whereby charging to smoothing capacitor 13 connected to the VDD terminal is started via JFET 101 and charging circuit 110. When the VDD terminal voltage rises, and SWC circuit 100 becomes operable, on/off control of switching element 5 is started. It is to be noted that a half-wave rectified voltage is applied to the VIN terminal of SWC circuit 100. Therefore, a VIN terminal voltage becomes 0 V during one of a period in which an alternating-current voltage has a positive value and a period in which an alternating-current voltage has a negative value, and such period becomes a non-charging period.

An output voltage applied to smoothing capacitor 8 at the secondary side is low upon a start. Therefore, a feedback signal from output voltage detection circuit 10 is not input to SWC circuit 100. When power is continuously supplied to the secondary side from transformer 4 with the switching operation, and therefore, the output voltage becomes equal to or higher than a specified voltage set by the output voltage detection circuit 10, output voltage detection circuit 10 drives photocoupler 11 so as to allow a current to flow from the FB terminal of SWC circuit 100 as a feedback signal. PLSWC circuit 180 changes an ON duty of switching element 5 to an appropriate state to keep the output voltage at the specified voltage based on this feedback signal and the information from the IS terminal relating to the value of the current flowing through switching element 5.

The operation of charging circuit 110 illustrated in FIG. 3 will be described in more detail.

The VDD terminal voltage is divided by resistors 116 and 117, input to HYS comparator 114, and is compared to reference voltage source 115. When the VDD terminal voltage rises to exceed a predetermined voltage value, and a high-level comparison output signal VDD_DET is output from HYS comparator 114 upon the start, N-type MOSFET 113 is turned on, and then, N-type MOSFET 111 is turned off. With this, power supply from the VIN terminal to SWC circuit 100 and smoothing capacitor 13 connected to the VDD terminal is shut off.

During the period in which the power supply from the VIN terminal is shut off, charges stored in smoothing capacitor 13 are consumed by the circuit current of SWC circuit 100. When the VDD terminal voltage lowers, and a low-level comparison output signal VDD_DET is output from HYS comparator 114, N-type MOSFET 111 is turned on. With this, power supply from the VIN terminal is again started. However, the power supply is possible only during the period in which the VIN terminal voltage exceeds the VDD terminal voltage, because the half-wave rectified voltage is applied to the VIN terminal.

HYS comparator 114 outputs a low-level comparison output signal VDD_DET when the VDD terminal voltage is equal to or lower than first reference voltage VDD_L (e.g., 4.5 V), and outputs a high-level comparison output signal VDD_DET when the VDD terminal voltage is equal to or higher than second reference voltage VDD_H (e.g., 5 V) higher than the first reference voltage.

Period requiring no charging TOFF in which comparison output signal VDD_DET is in a high level can be represented by the following equation (1), wherein the hysteresis width of the VDD terminal voltage is defined as AVDD, a capacitance of smoothing capacitor 13 connected to the VDD terminal is defined as CVDD, and an average value of the circuit current of SWC circuit 100 is defined as IDD.

$$TOFF = CVDD \times \Delta VDD / IDD \quad (1)$$

The operation of the direct current power supply circuit according to the first exemplary embodiment will be described with reference to timing charts in FIGS. 4 to 6.

Firstly, the case where the charging interval of smoothing capacitor 13 connected to the VDD terminal is shorter than the alternating-current voltage cycle will be described with reference to FIG. 4. This corresponds to the case where the above period requiring no charging TOFF is shorter than a half of cycle T of commercial power supply 1. For example, this is the case of CVDD=0.1 µF, ΔVDD=0.5 V, IDD=10 µA, TOFF=5 ms, and T=20 ms.

Figure 4:
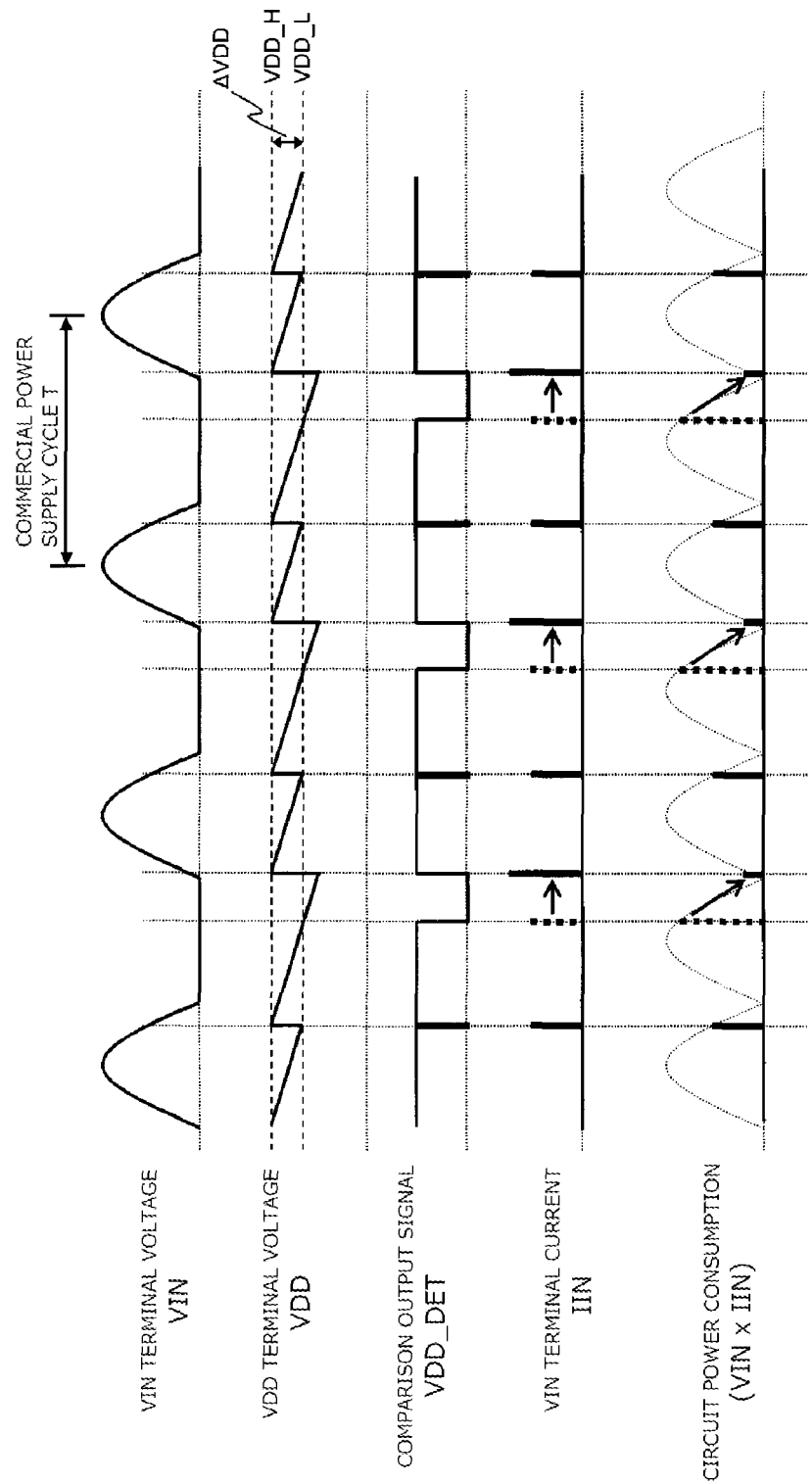
FIG. 4 is a timing chart for describing an operation in which a charging interval is shorter than an alternating-current voltage cycle in the direct current power supply circuit according to the first exemplary embodiment.

In FIG. 4, a solid line of VIN terminal current IIN indicates a charging current supplied to charging circuit 110 from the VIN terminal, and a broken line of VIN terminal current IIN indicates a charging current if power is supplied to smoothing capacitor 13 connected to the VDD terminal just after comparison output signal VDD_DET becomes a low level. Circuit consumption power indicates a product of the VIN terminal voltage and VIN terminal current IIN.

When the VDD terminal voltage lowers by the circuit current of SWC circuit 100, and comparison output signal VDD_DET becomes a low level, N-type MOSFET 111 is turned on. In this case, if the VIN terminal voltage exceeds VDD terminal voltage, charging is immediately started, so that the VDD terminal voltage rises.

Since period requiring no charging TOFF is shorter than a half of cycle T of commercial power supply 1, a timing at which comparison output signal VDD_DET becomes a low level occurs during the non-charging period set by the application of the half-wave rectified voltage to the VIN terminal of SWC circuit 100. In this case, charging cannot immediately be started, so that the VDD terminal voltage keeps lowering. In this case, if the VIN terminal voltage exceeds the VDD terminal voltage in the next charging period, charging is immediately started, so that the VDD terminal voltage rises. In this case, VIN terminal current TIN slightly increases, compared to the case where charging is immediately started after comparison output signal VDD_DET becomes a low level. However, the circuit power consumption is reduced, because the VIN terminal voltage is sufficiently low. This is because the power loss of JFET 101 upon the charging is reduced.

Subsequently, the case where the charging interval becomes equal to the alternating-current voltage cycle will be described with reference to FIG. 5. This corresponds to the case where the above period requiring no charging TOFF satisfies the following equation (2). For example, this is the case of CVDD=0.33 µf, ΔVDD=0.5 V, IDD=10 µA, TOFF=16.5 ms, and T=20 ms.

$$T/2 < TOFF < T \quad (2)$$

Figure 5:
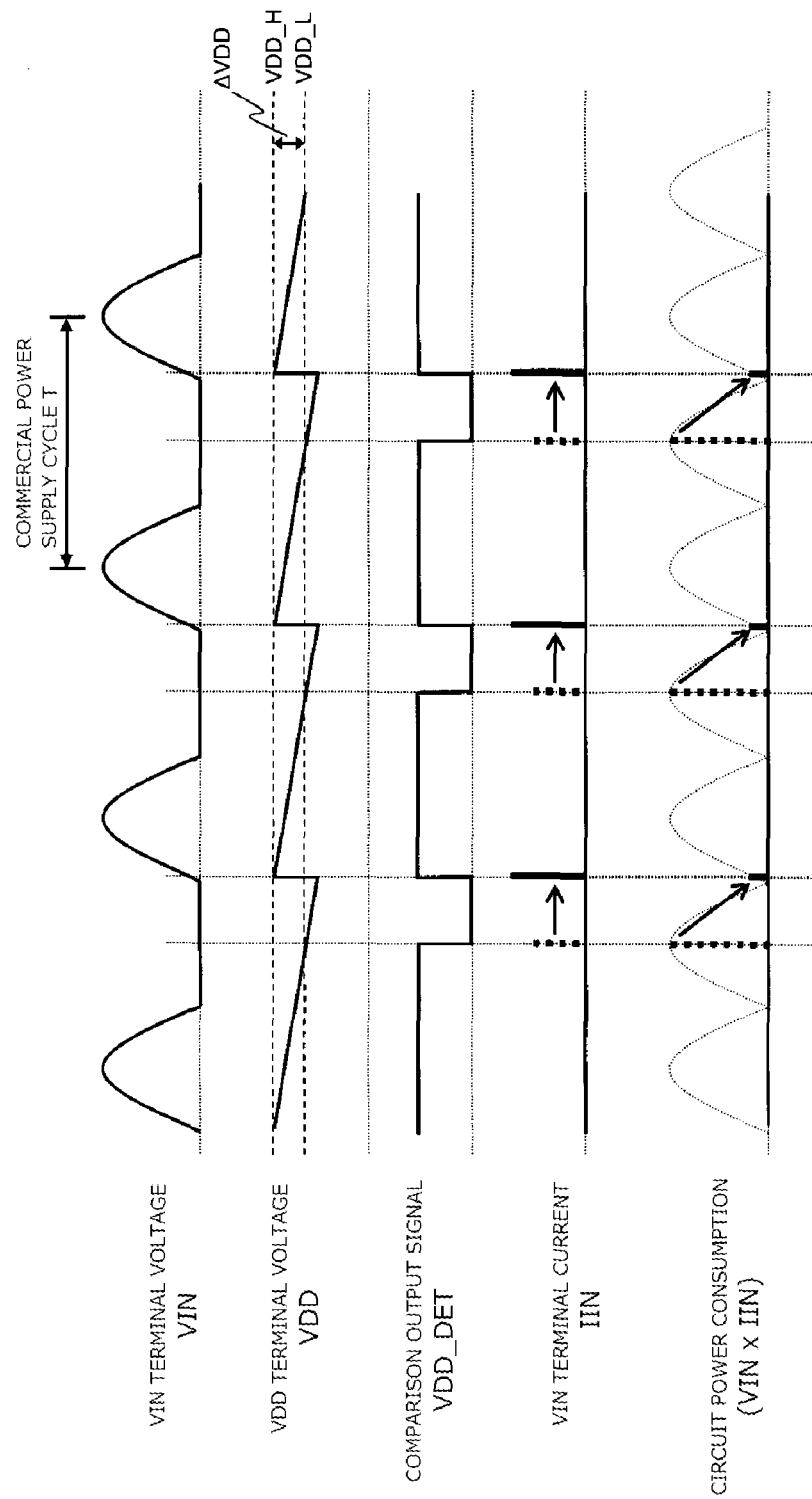
FIG. 5 is a timing chart for describing an operation in which a charging interval is equal to the alternating-current voltage cycle in the direct current power supply circuit according to the first exemplary embodiment.

In FIG. 5, the timing at which the VDD terminal voltage lowers and comparison output signal VDD_DET becomes a low level is in the non-charging period in which the VIN terminal voltage is 0 V. Therefore, in every charging timing, charging is started during the period in which the VIN terminal voltage rises to exceed the VDD terminal voltage, and charging is ended during the period in which the VIN terminal voltage is low. Accordingly, the circuit power consumption is reduced.

Subsequently, the case where the charging interval becomes twice the alternating-current voltage cycle will be described with reference to FIG. 6. This corresponds to the case where the above period requiring no charging TOFF satisfies the following equation (3). For example, this is the case of CVDD=0.68 µf, ΔVDD=0.5 V, IDD=10 µA, TOFF=34 ms, and T=20 ms.

$$3T/2 < TOFF < 2T \quad (3)$$

Figure 6:
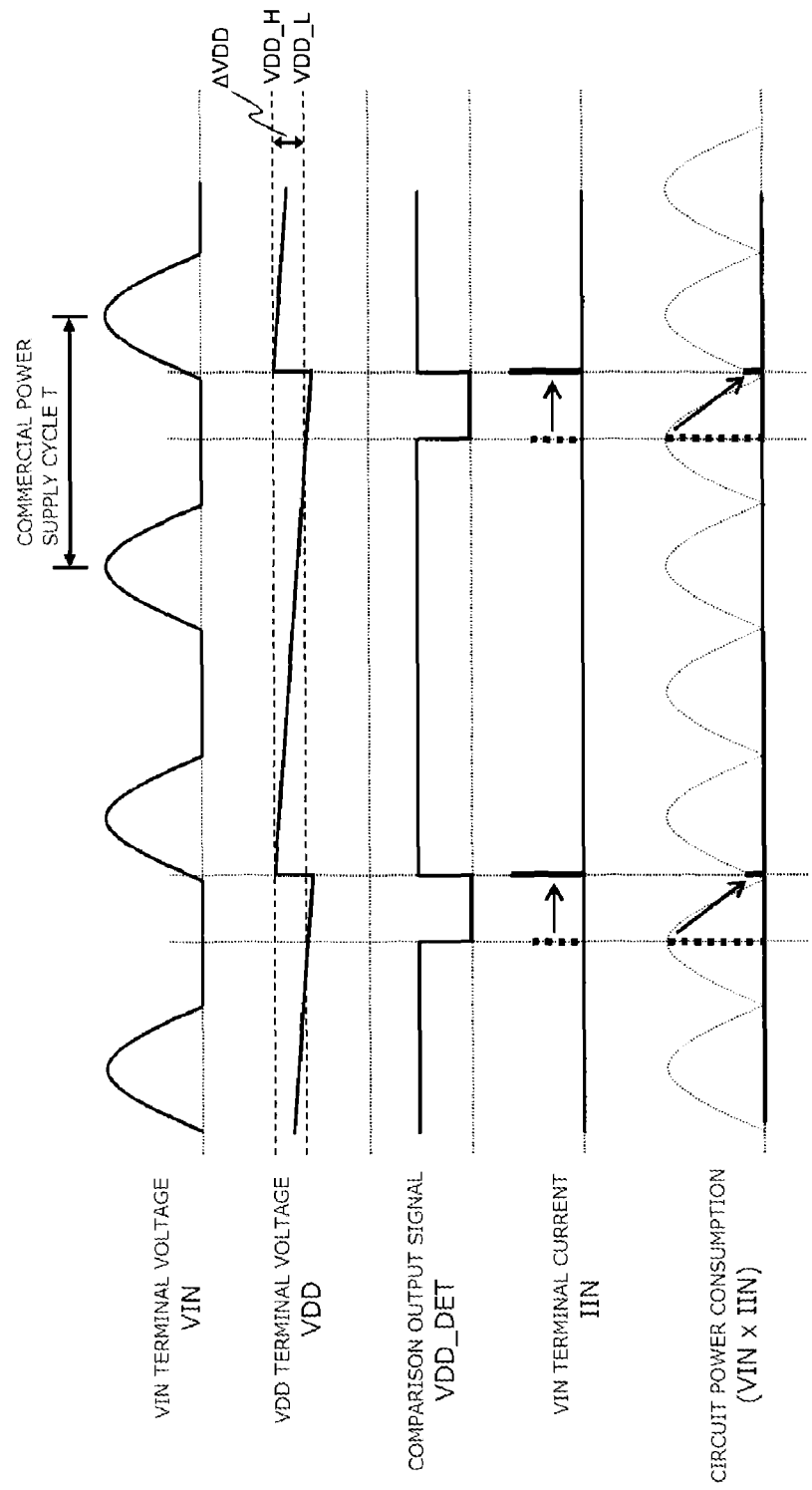
FIG. 6 is a timing chart for describing an operation in which a charging interval is twice the alternating-current voltage cycle in the direct current power supply circuit according to the first exemplary embodiment.

In FIG. 6, the timing at which the VDD terminal voltage lowers and comparison output signal VDD_DET becomes a low level is in the non-charging period in which the VIN terminal voltage is 0 V. Therefore, in every charging timing, charging is started during the period in which the VIN terminal voltage rises to exceed the VDD terminal voltage, and charging is ended during the period in which the VIN terminal voltage is low, as in FIG. 5. Accordingly, the circuit power consumption is reduced.

The case in FIG. 5 or FIG. 6 provides larger effect of reducing circuit power consumption than in the case in FIG. 4. To start charging during the period in which the VIN terminal voltage rises to exceed the VDD terminal voltage in every charging timing, the following equation (4) may be satisfied.

$$(2n-1) \times T/2 < TOFF < 2n \times T/2 \text{ (} n \text{ is a positive integer)} \quad (4)$$

From the above, the direct current power supply circuit according to the present exemplary embodiment and the switching power supply device including the direct current power supply circuit does not need to monitor the VIN terminal voltage, thereby reducing power supplied to SWC circuit 100. In addition, the hysteresis width of HYS comparator 114 or smoothing capacitor 13 externally connected to the VDD terminal is only adjusted according to the circuit current of SWC circuit 100, whereby the direct current power supply circuit according to the present exemplary embodiment can easily be applied to various control circuits with various specifications having different circuit current.

If comparison output signal VDD_DET becomes a low level and the VIN terminal voltage exceeds the VDD terminal voltage even when the VDD terminal voltage abnormally lowers due to an increase in consumption current of SWC circuit 100, charging is immediately started.

In a transient area where the circuit current changes, such as upon a start or upon a change in a switching operation, a timing at which comparison output signal VDD_DET becomes a low level may not appear during the non-charging period in which the VIN terminal voltage is 0 V, and therefore, the effect of reducing power consumption may be unnecessary.

Notably, the hysteresis of HYS comparator 114 may be generated by delaying the time for changing comparison output signal VDD_DET from a low level to a high level by utilizing a detection delay of a comparator circuit.

Modification of First Exemplary Embodiment

A modification of a switching power supply device including the direct current power supply circuit according to the first exemplary embodiment will be described below with reference to FIG. 7. The switching power supply device according to the modification of the first exemplary embodiment is substantially equal to the switching power supply device according to the first exemplary embodiment, except for a switching power supply control system.

Figure 7:
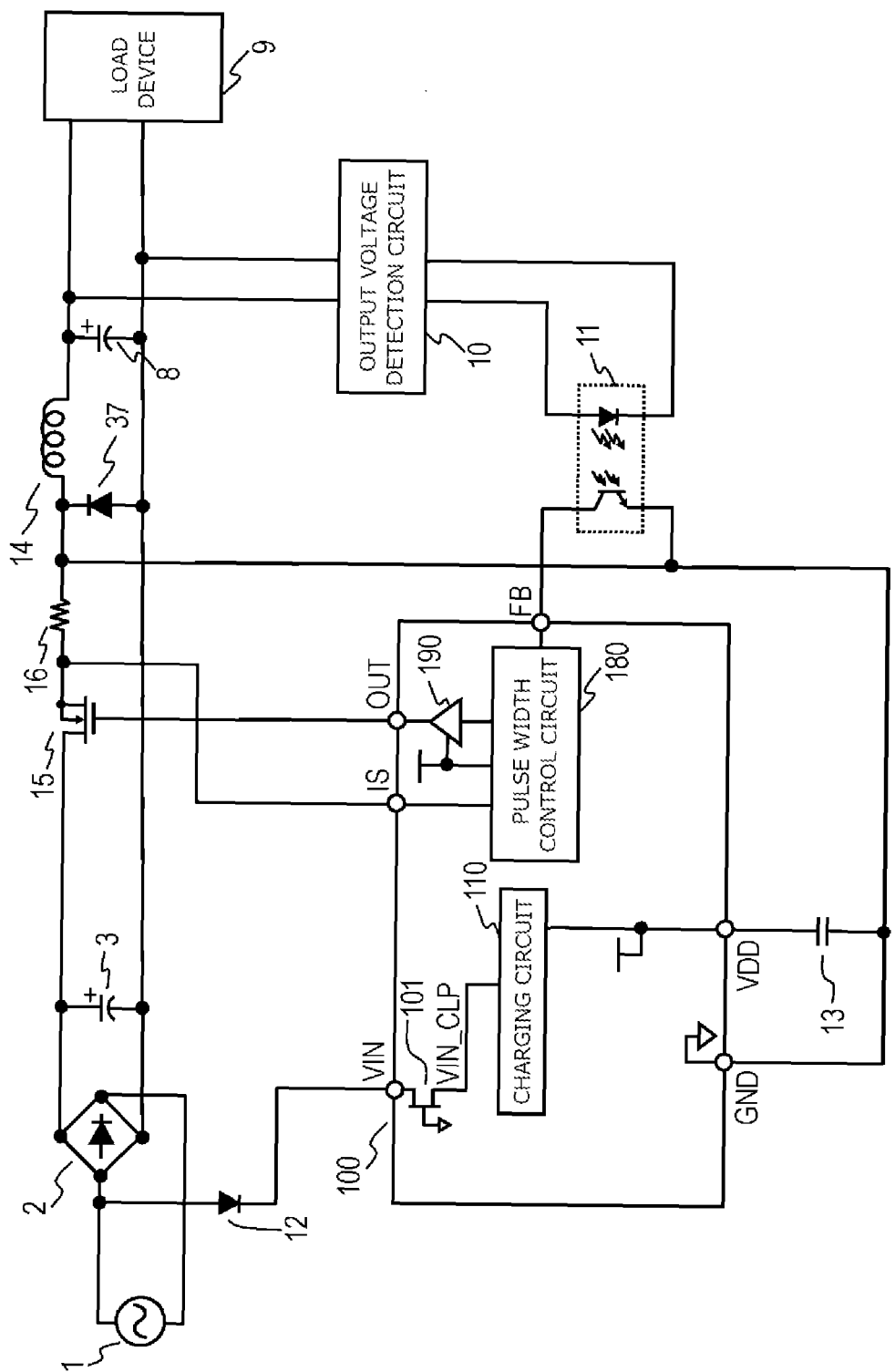
FIG. 7 is a circuit diagram illustrating a modification of a switching power supply device including the direct current power supply circuit according to the first exemplary embodiment.

While the first exemplary embodiment describes a flyback switching power supply device, the switching power supply device according to the present modification illustrated in FIG. 7 is of a step-down chopper type. Switching element 15 is connected to bridge diode 2 that rectifies and smooths an alternating-current voltage from commercial power supply 1 and smoothing capacitor 3. The GND terminal of SWC circuit 100, choke coil 14, and rectification diode 37 are connected to switching element 15 via resistor 16.

The difference in the switching control between the flyback type and the step-down chopper type will not be described here.

Although the switching control system is different from the switching power supply device according to the first exemplary embodiment, the direct current power supply circuit that supplies power to SWC circuit 100 has the similar configuration. Therefore, the equivalent effect concerning the reduction in power consumption of the direct current power supply circuit can be obtained, even in another switching control system such as the step-down chopper type.

Second Exemplary Embodiment

A direct current power supply circuit according to a second exemplary embodiment and a switching power supply device including the direct current power supply circuit will next be described with reference to FIGS. 8 to 12.

The first exemplary embodiment describes the configurations of the direct current power supply circuit in which a half-wave rectified direct-current voltage is applied to the VIN terminal and the switching power supply device including the direct current power supply circuit. On the other hand, the second exemplary embodiment describes configurations of a direct current power supply circuit in which a full-wave rectified direct-current voltage is applied to the VIN terminal and a switching power supply device including this direct current power supply circuit. Specifically, rectification circuit 902 is a full-wave rectification circuit in the present exemplary embodiment.

Figure 8:
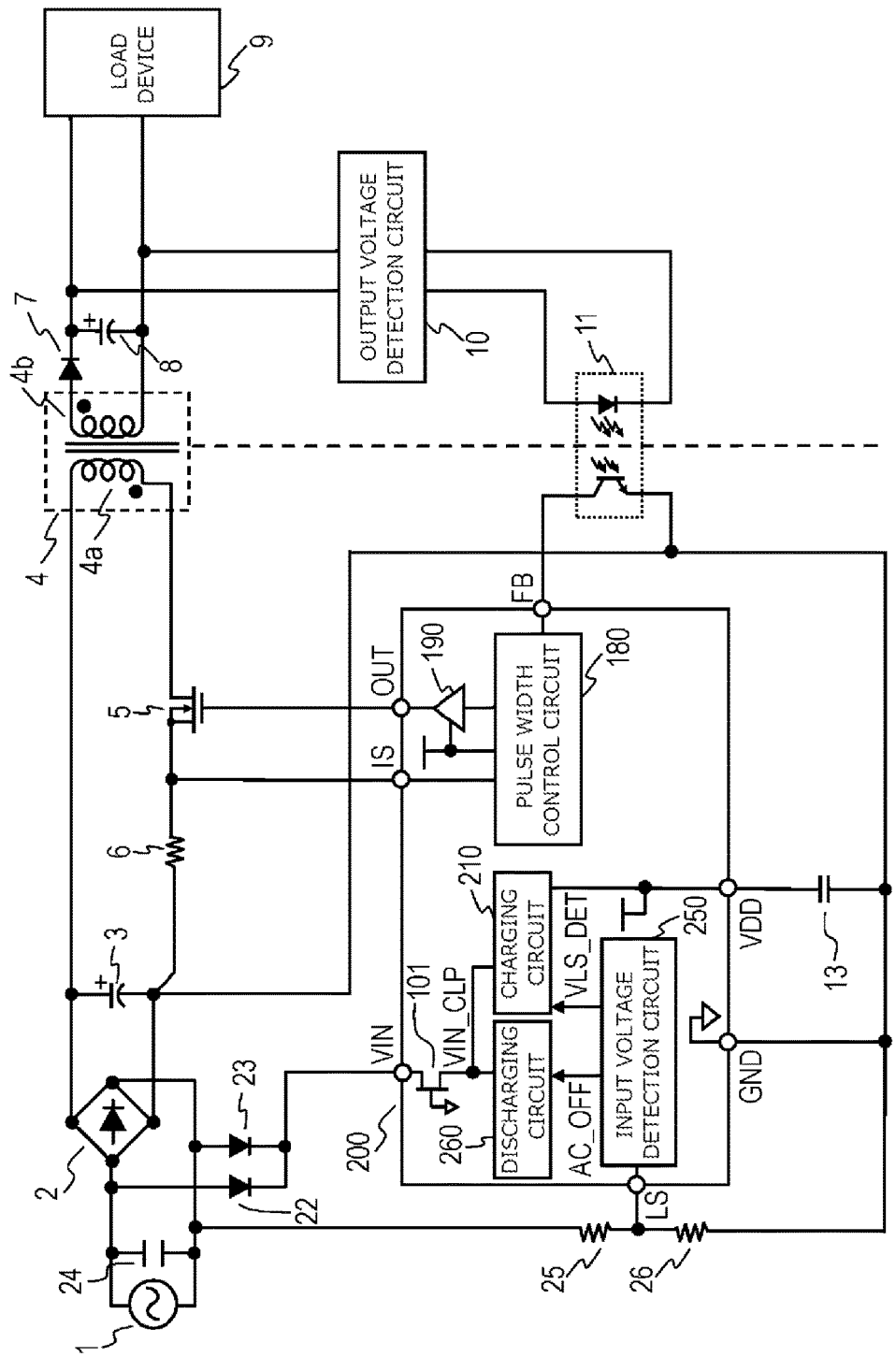
FIG. 8 is a circuit diagram illustrating one configuration of a switching power supply device including a direct current power supply circuit according to a second exemplary embodiment.

FIG. 8 is a circuit diagram illustrating one configuration of a switching power supply device including the direct current power supply circuit according to the present second exemplary embodiment. Compared to FIG. 2 illustrating the configuration of the switching power supply device including the direct current power supply circuit according to the first exemplary embodiment, SWC circuit 200 and its peripheral circuit are different. The description overlapping with the first exemplary embodiment will not be repeated below.

In the switching power supply device according to the second exemplary embodiment, across-the-line capacitor (X capacitor) 24 is connected to commercial power supply 1, and the VIN terminal of SWC circuit 200 is connected to both ends of X capacitor 24 through rectification diodes 22 and 23.

SWC circuit 200 also includes the LS terminal as an external input terminal, and includes JFET 101, charging circuit 210, PLSWC circuit 180, drive circuit 190, input voltage detection (hereinafter referred to as IVD) circuit 250, and discharging circuit 260.

The LS terminal is connected to resistors 25 and 26 for dividing voltage between commercial power supply 1 and the GND terminal of SWC circuit.

Figure 9:
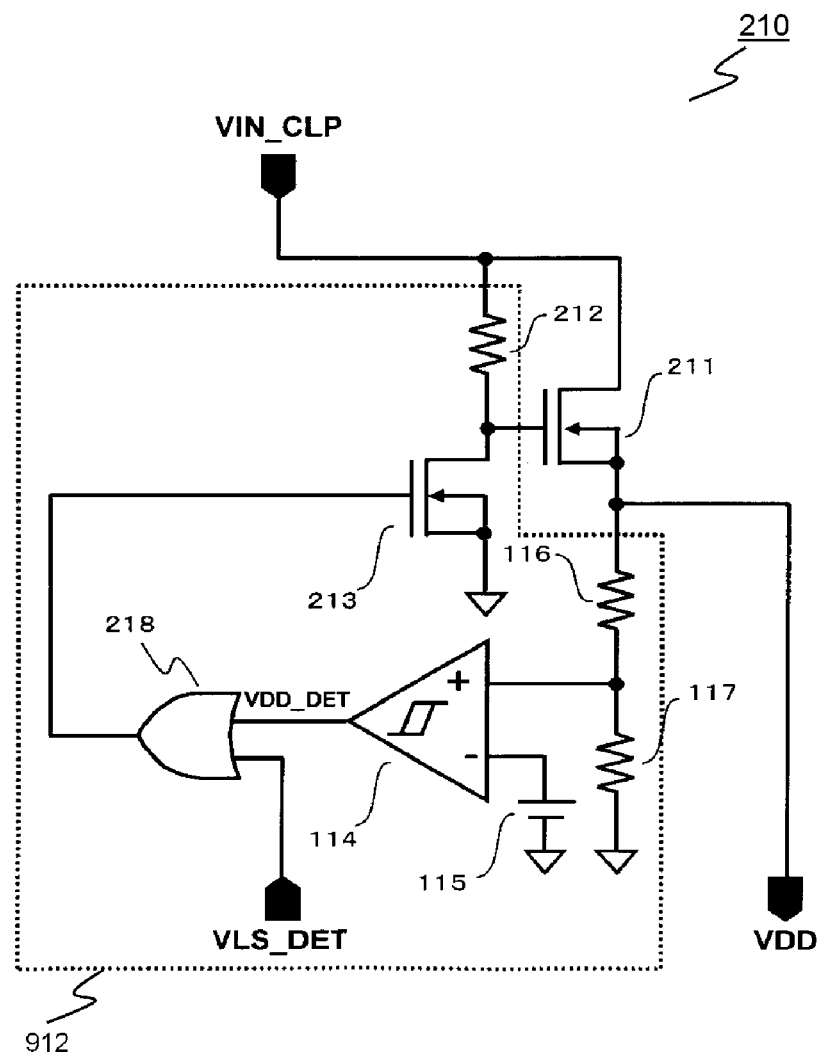
FIG. 9 is a circuit diagram illustrating one configuration of a charging circuit according to the second exemplary embodiment.

Charging circuit 210 receives input clamp voltage signal VIN_CLP and supplies power to SWC circuit 200 and smoothing capacitor 13 connected to the VDD terminal. For example, charging circuit 210 includes N-type MOSFETs 211 and 213, resistors 212, 116, and 117, HYS comparator 114, reference voltage source 115, and OR circuit 218 as illustrated in FIG. 9, and has functions corresponding to charging switch 911 and CSWC circuit 912 in FIG. 1.

Figure 10:
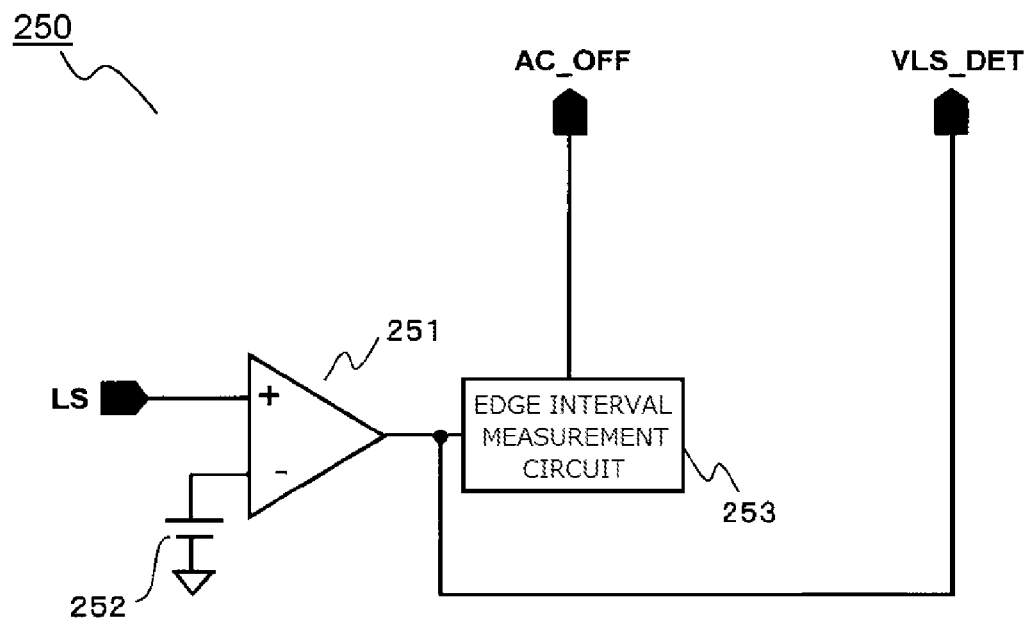
FIG. 10 is a circuit diagram illustrating one configuration of an input voltage detection circuit according to the second exemplary embodiment.

IVD circuit 250 outputs VLS detection signal VLS_DET to charging circuit 210 based on a half-wave rectified voltage signal input from the LS terminal. IVD circuit 250 also detects that commercial power supply 1 is shut off, and outputs this detection result to discharging circuit 260 as input shut-off detection signal AC_OFF. For example, IVD circuit 250 includes comparator 251, reference voltage source 252, and edge interval measurement circuit 253 as illustrated in FIG. 10.

Figure 11:
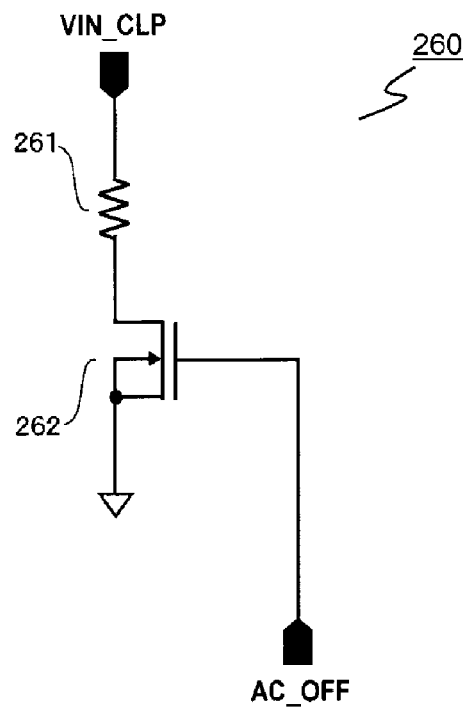
FIG. 11 is a circuit diagram illustrating one configuration of a discharging circuit according to the second exemplary embodiment.

Discharging circuit 260 receives input shut-off detection signal AC_OFF, and allows a current to flow from input clamp voltage signal line VIN_CLP upon the shut-off of commercial power supply 1. For example, discharging circuit 260 includes resistor 261 and N-type MOSFET 262 as illustrated in FIG. 11.

The operation of the switching power supply device thus configured according to the second exemplary embodiment will be described below mainly about the different points from the first exemplary embodiment.

A full-wave rectified voltage rectified by rectification diodes 22 and 23 is applied to the VIN terminal of SWC circuit 200, whereby power is supplied to SWC circuit 200 and smoothing capacitor 13 connected to the VDD terminal via JFET 101 and charging circuit 210.

The operations of charging circuit 210 and IVD circuit 250 will be described in more detail.

A half-wave rectified direct-current voltage from commercial power supply 1 is lowered by resistors 25 and 26, and then, input to IVD circuit 250 from the LS terminal. The input voltage is compared to reference voltage source 252 by comparator 251. Comparator 251 outputs a high-level signal as VLS detection signal VLS_DET, when an LS terminal voltage is equal to or higher than third reference voltage VLS_L (e.g., 1 V). VLS detection signal VLS_DET is used for setting a non-charging period as a charging inhibition signal.

VLS detection signal VLS_DET and comparison output signal VDD_DET of HYS comparator 114 are input to OR circuit 218 in charging circuit 210. The logical add is output to N-type MOSFET 213. Specifically, during the non-charging period in which the VDD terminal voltage is equal to or higher than second reference voltage VDD_H or the LS terminal voltage is equal to or higher than third reference voltage VLS_L, N-type MOSFET 213 is turned on, and then, N-type MOSFET 211 is turned off.

Figure 12:
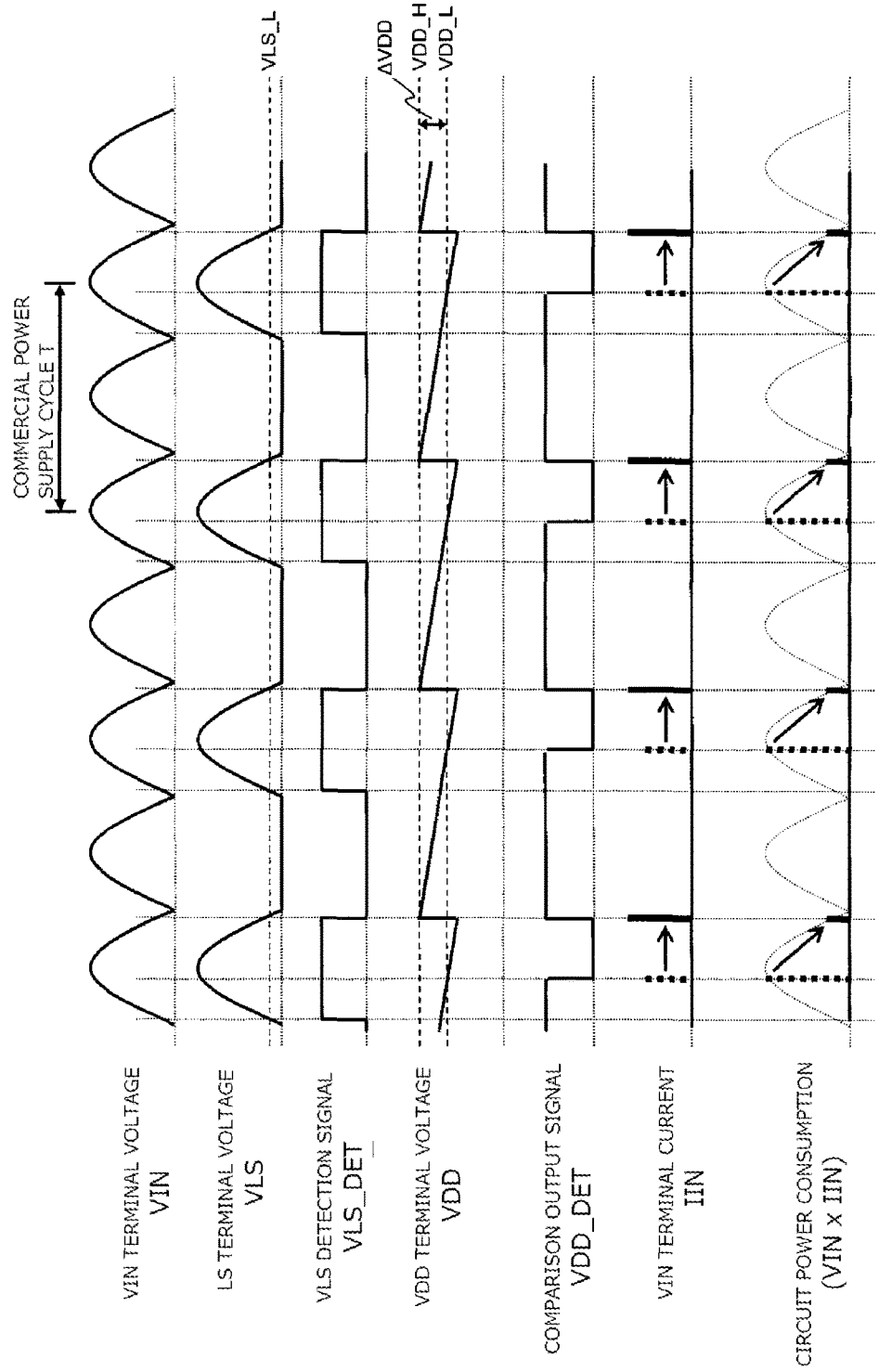
FIG. 12 is a timing chart for describing an operation of the direct current power supply circuit according to the second exemplary embodiment.

FIG. 12 is a timing chart for describing the operation of the direct current power supply circuit according to the second exemplary embodiment. This chart illustrates that the charging interval is equal to the alternating-current voltage cycle.

In FIG. 12, the timing at which the VDD terminal voltage lowers and comparison output signal VDD_DET becomes a low level is in the non-charging period in which VLS detection signal VLS_DET becomes a high level. In this case, charging cannot immediately be started, so that the VDD terminal voltage keeps lowering. When the LS terminal voltage becomes equal to or lower than third reference voltage VLS_L, and VLS detection signal VLS_DET is changed to a low level, the charging period begins, so that charging is started, and the VDD terminal voltage rises. In this case, the VIN terminal current IIN slightly increases, compared to the case where charging is immediately started after comparison output signal VDD_DET becomes a low level. However, the circuit power consumption is reduced, because the VIN terminal voltage is sufficiently low (e.g., 20 V) corresponding to third reference voltage VLS_L.

Next, the discharging function of X capacitor 24 will briefly be described.

X capacitor 24 connected between lines of commercial power supply 1 for noise cancellation has to quickly discharge residual charges for prevention of electric shock when commercial power supply 1 is shut off. Therefore, the direct current power supply circuit according to the present exemplary embodiment has a discharging function of X capacitor 24.

IVD circuit 250 includes edge interval measurement circuit 253 for measuring an edge interval in which VLS detection signal VLS_DET is changed from the low level to the high level or from the high level to the low level. When the edge interval becomes equal to or longer (e.g., 30 ms) than the cycle of commercial power supply 1 due to the shut-off of commercial power supply 1, IVD circuit 250 outputs high-level input shut-off signal AC_OFF.

When high-level input shut-off signal AC_OFF is input to discharging circuit 260, N-type MOSFET 262 is turned on, and the current limited by resistor 261 is flown from input clamp voltage signal line VIN_CLP.

As a result, when commercial power supply 1 is shut off, residual charges in X capacitor 24 are discharged through rectification diode 22 or 23, JFET 101, discharging circuit 260, and bridge diode 2.

From the above, the direct current power supply circuit according to the present exemplary embodiment and the switching power supply device including the direct current power supply circuit can reduce power supplied to SWC circuit 200, even if the voltage applied to the VIN terminal is a full-wave rectified voltage in order to implement the discharging function of X capacitor 24. In addition, it is only necessary that a half-wave rectified voltage signal is input to the LS terminal. Therefore, compared to the case of using a full-wave rectified voltage signal such as a VIN terminal voltage, the present exemplary embodiment can reduce a power loss for monitoring a voltage of commercial power supply 1. In addition, the hysteresis width of HYS comparator 114 or smoothing capacitor 13 externally connected to the VDD terminal is only adjusted according to the circuit current of SWC circuit 200, whereby the direct current power supply circuit according to the present exemplary embodiment can easily be applied to various control circuits with various specifications having different circuit current.

If comparison output signal VDD_DET becomes a low level and VLS detection signal VLS_DET has a low level even when the VDD terminal voltage abnormally lowers due to an increase in consumption current of SWC circuit 200, charging is immediately started.

Notably, comparator 251 in IVD circuit 250 may have hysteresis for preventing malfunction caused by noise of the LS terminal voltage.

It is also to be noted that VLS detection signal VLS_DET in synchronization with the cycle of commercial power supply 1 may be generated from a full-wave rectified voltage signal, such as a VIN terminal voltage, with a divider circuit without using the LS terminal.

Third Exemplary Embodiment

A direct current power supply circuit according to a third exemplary embodiment and a switching power supply device including the direct current power supply circuit will next be described with reference to FIGS. 13 to 16.

The first exemplary embodiment describes the direct current power supply circuit that reduces circuit current consumption with the operation in which charging is started during the period in which the VIN terminal voltage rises to exceed the VDD terminal voltage, and the charging is ended during the period in which the VIN terminal voltage is low. On the other hand, the third exemplary embodiment describes a direct current power supply circuit that reduces power consumption with an operation in which charging is forcibly started during a period in which the VIN terminal voltage lowers to be sufficiently low, and a switching power supply device including this direct current power supply circuit.

Figure 13:
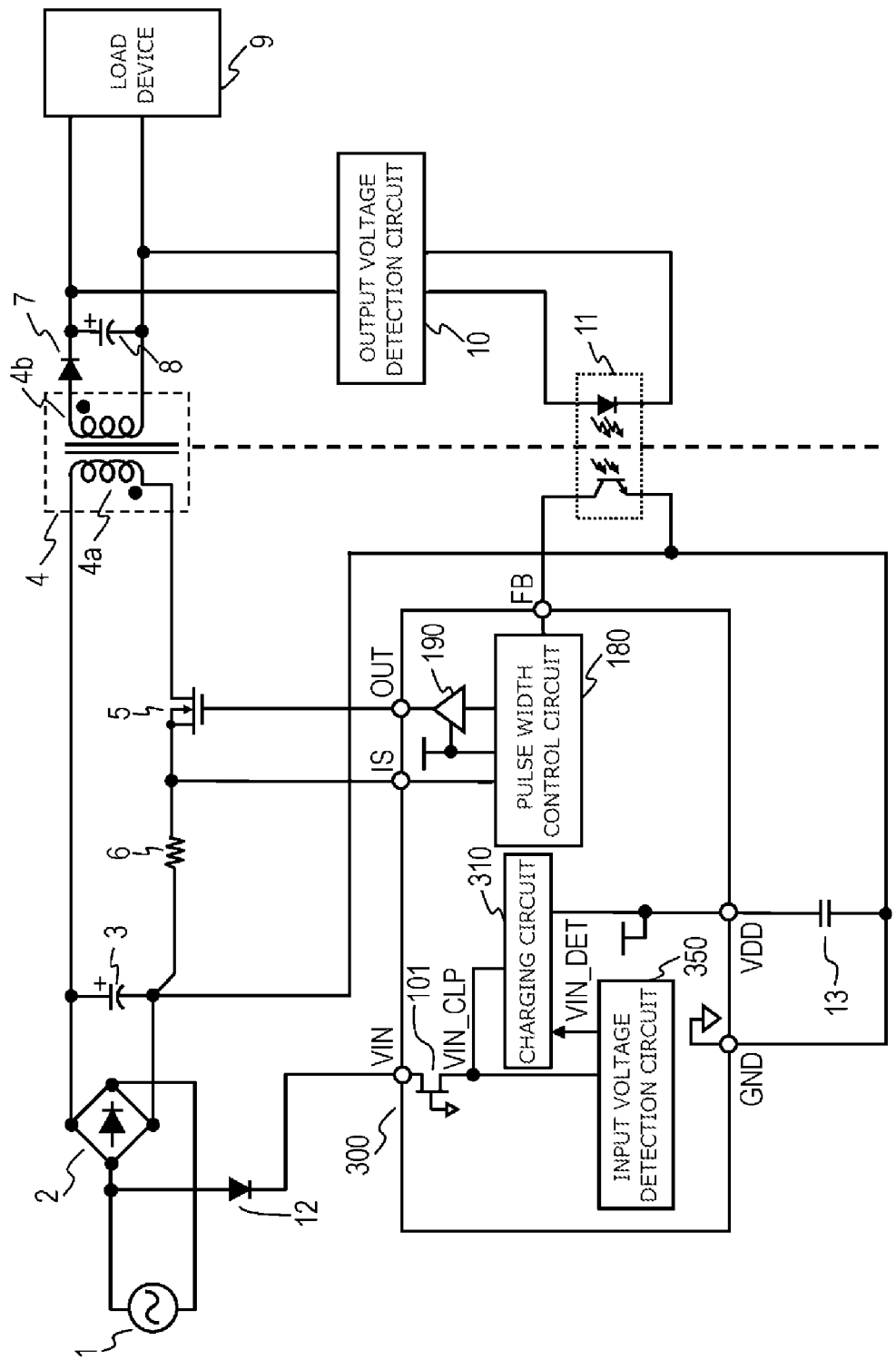
FIG. 13 is a circuit diagram illustrating one configuration of a switching power supply device including a direct current power supply circuit according to a third exemplary embodiment.

FIG. 13 is a circuit diagram illustrating one configuration of a switching power supply device including the direct current power supply circuit according to the present third exemplary embodiment. Compared to FIG. 2 illustrating the configuration of the switching power supply device including the direct current power supply circuit according to the first exemplary embodiment, SWC circuit 300 is different. The description overlapping with the first exemplary embodiment will not be repeated below.

SWC circuit 300 according to the third exemplary embodiment includes JFET 101, charging circuit 310, PLSWC circuit 180, drive circuit 190, and IVD circuit 350.

Figure 14:
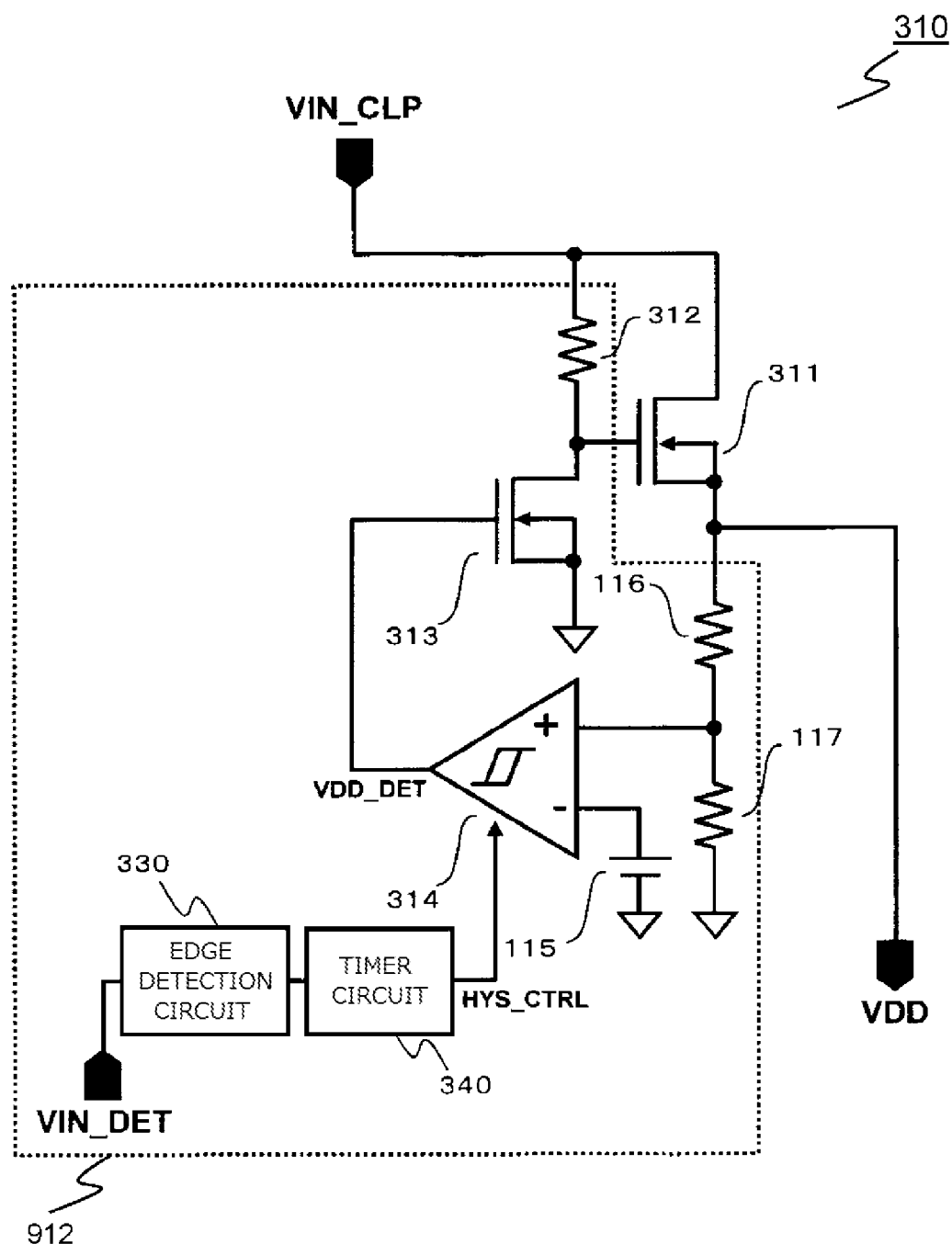
FIG. 14 is a circuit diagram illustrating one configuration of a charging circuit according to the third exemplary embodiment.

Charging circuit 310 receives input clamp voltage signal VIN_CLP and supplies power to SWC circuit 300 and smoothing capacitor 13 connected to the VDD terminal. For example, charging circuit 310 includes N-type MOSFETs 311 and 313, resistors 312, 116, and 117, HYS comparator 314, reference voltage source 115, edge detection circuit 330, and timer circuit 340 as illustrated in FIG. 14, and has functions corresponding to charging switch 911 and CSWC circuit 912 in FIG. 1.

Figure 15:
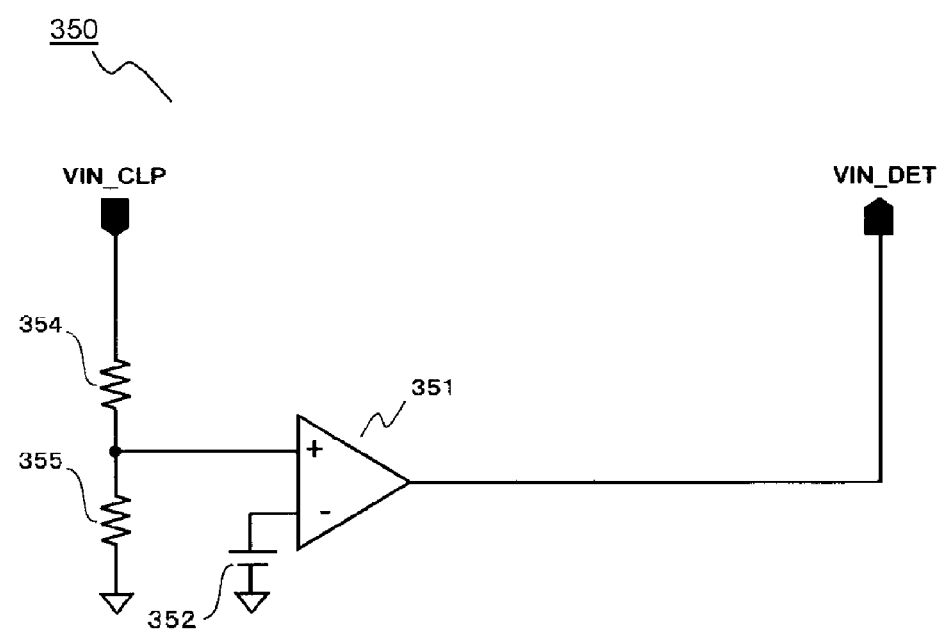
FIG. 15 is a circuit diagram illustrating one configuration of an input voltage detection circuit according to the third exemplary embodiment.

IVD circuit 350 outputs the VIN terminal voltage drop signal VIN_DET to charging circuit 310 based on input clamp voltage signal VIN_CLP. For example, IVD circuit 350 includes comparator 351, reference voltage source 352, and resistors 354 and 355 as illustrated in FIG. 15.

The operation of the switching power supply device thus configured according to the third exemplary embodiment will be described below mainly about the different points from the first exemplary embodiment.

A half-wave rectified voltage rectified by rectification diode 12 is applied to the VIN terminal of SWC circuit 300, whereby power is supplied to SWC circuit 300 and smoothing capacitor 13 connected to the VDD terminal via JFET 101 and charging circuit 310.

In IVD circuit 350, input clamp voltage VIN_CLP is lowered by resistors 354 and 355, and input to comparator 351. The input voltage is compared to reference voltage source 352. Comparator 351 outputs a high-level signal as VIN detection signal VIN_DET, when the VIN terminal voltage is equal to or higher than fourth reference voltage VIN_L (e.g., 20 V). VIN detection signal VIN_DET is used to generate hysteresis control signal (hereinafter referred to as HYSC signal) HYS_CTRL for setting a charging period.

When VIN detection signal VIN_DET signal is input to charging circuit 310, HYSC signal HYS_CTRL becomes a high level during a predetermined period in which VIN detection signal VIN_DET is changed from a high level to a low level by edge detection circuit 330 and timer circuit 340. HYSC signal HYS_CTRL is a signal for controlling a hysteresis width of HYS comparator 314. First reference voltage VDD_L is set to be high (e.g., it is changed from 4.5

V to 4.9 V) so as to decrease the hysteresis width during the period in which HYSC signal HYS_CTRL has a high level. Specifically, first reference voltage VDD_L becomes higher than the VDD terminal voltage during this period, so that the charging period is set.

The charging period set by timer circuit 340 is set (e.g., 1 ms) to be longer than the charging time of smoothing capacitor 13 connected to the VDD terminal and also set such that the VIN terminal voltage becomes not too high.

Figure 16:
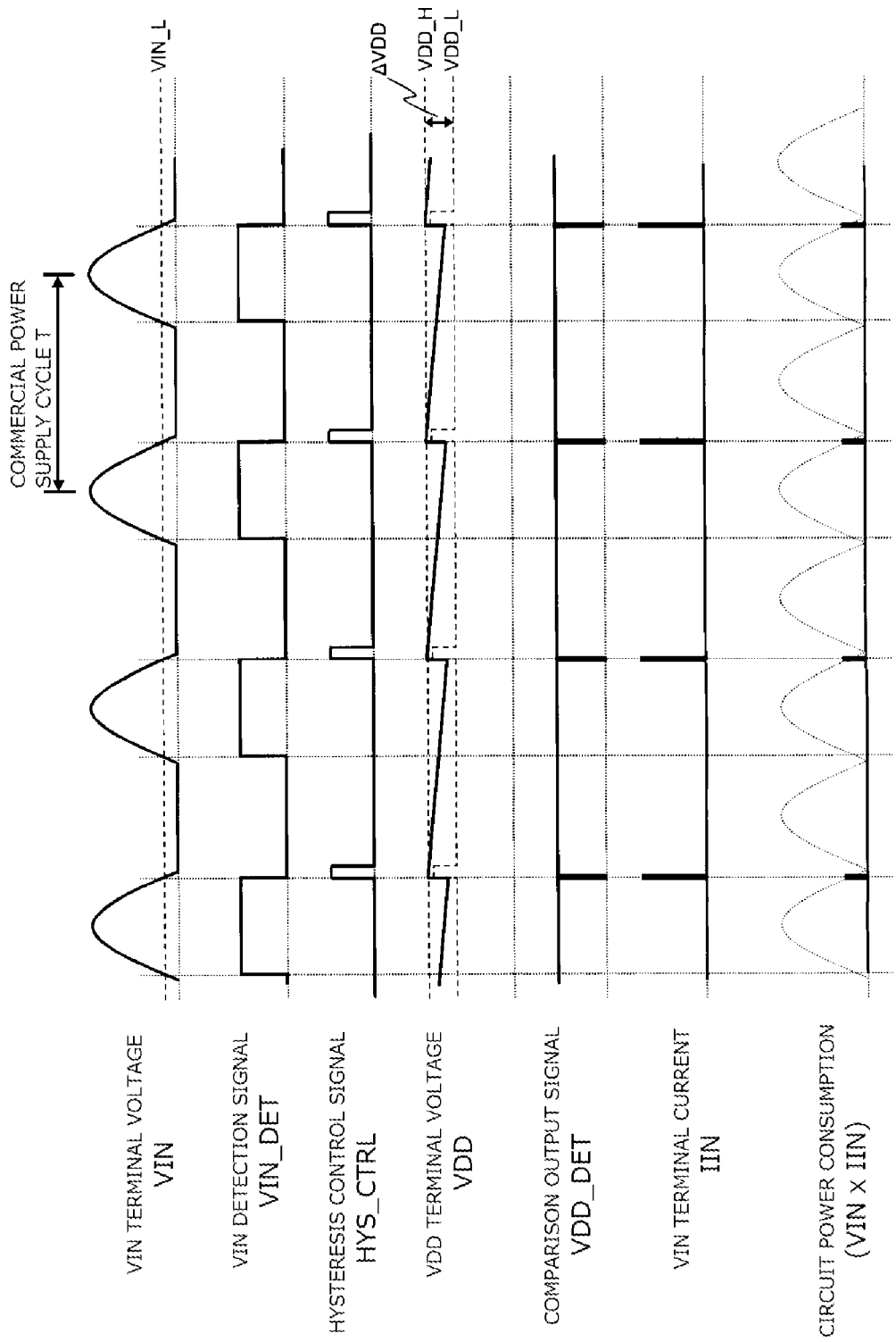
FIG. 16 is a timing chart for describing an operation of the direct current power supply circuit according to the third exemplary embodiment.

FIG. 16 is a timing chart for describing the operation of the direct current power supply circuit according to the third exemplary embodiment.

In FIG. 16, when the VIN terminal voltage lowers and VIN detection signal VIN_DET becomes a low level, HYSC signal HYS_CTRL becomes a high level, and first reference voltage VDD_L becomes higher than the VDD terminal voltage. With this, comparison output signal VDD_DET becomes a low level. With this, N-type MOSFET 311 is turned on, whereby power supply to SWC circuit 300 and smoothing capacitor 13 connected to the VDD terminal is immediately started. In this case, the circuit power consumption is reduced, because the VIN terminal voltage is sufficiently low (e.g., 20 V) corresponding to fourth reference voltage VIN_L.

From the above, the direct current power supply circuit according to the present exemplary embodiment and the switching power supply device including this direct current power supply circuit can easily reduce power supplied to various control circuits with various specifications having different circuit current only by adjusting the hysteresis width of HYS comparator 314 or smoothing capacitor 13 externally connected to the VDD terminal according to the circuit current of SWC circuit 300.

In addition, the range of setting the capacitance of smoothing capacitor 13 externally connected to the VDD terminal is large, whereby the VDD terminal voltage is easily stabilized.

If comparison output signal VDD_DET becomes a low level and the VIN terminal voltage exceeds the VDD terminal voltage even when the VDD terminal voltage abnormally lowers due to an increase in consumption current of SWC circuit 300, charging is immediately started.

In a transient area where the circuit current changes, such as upon a start or upon a change in a switching operation, the charging period may not be set with VIN detection signal VIN_DET, and therefore, the effect of reducing power consumption may be unnecessary.

Fourth Exemplary Embodiment

A direct current power supply circuit according to a fourth exemplary embodiment and a switching power supply device including the direct current power supply circuit will next be described with reference to FIGS. 17 to 19.

The third exemplary embodiment describes the configurations of the direct current power supply circuit in which a half-wave rectified direct-current voltage is applied to the VIN terminal and the switching power supply device including this direct current power supply circuit. On the other hand, the fourth exemplary embodiment describes configurations of a direct current power supply circuit in which a full-wave rectified direct-current voltage is applied to the VIN terminal and a switching power supply device including this direct current power supply circuit, as in the second exemplary embodiment.

Figure 17:
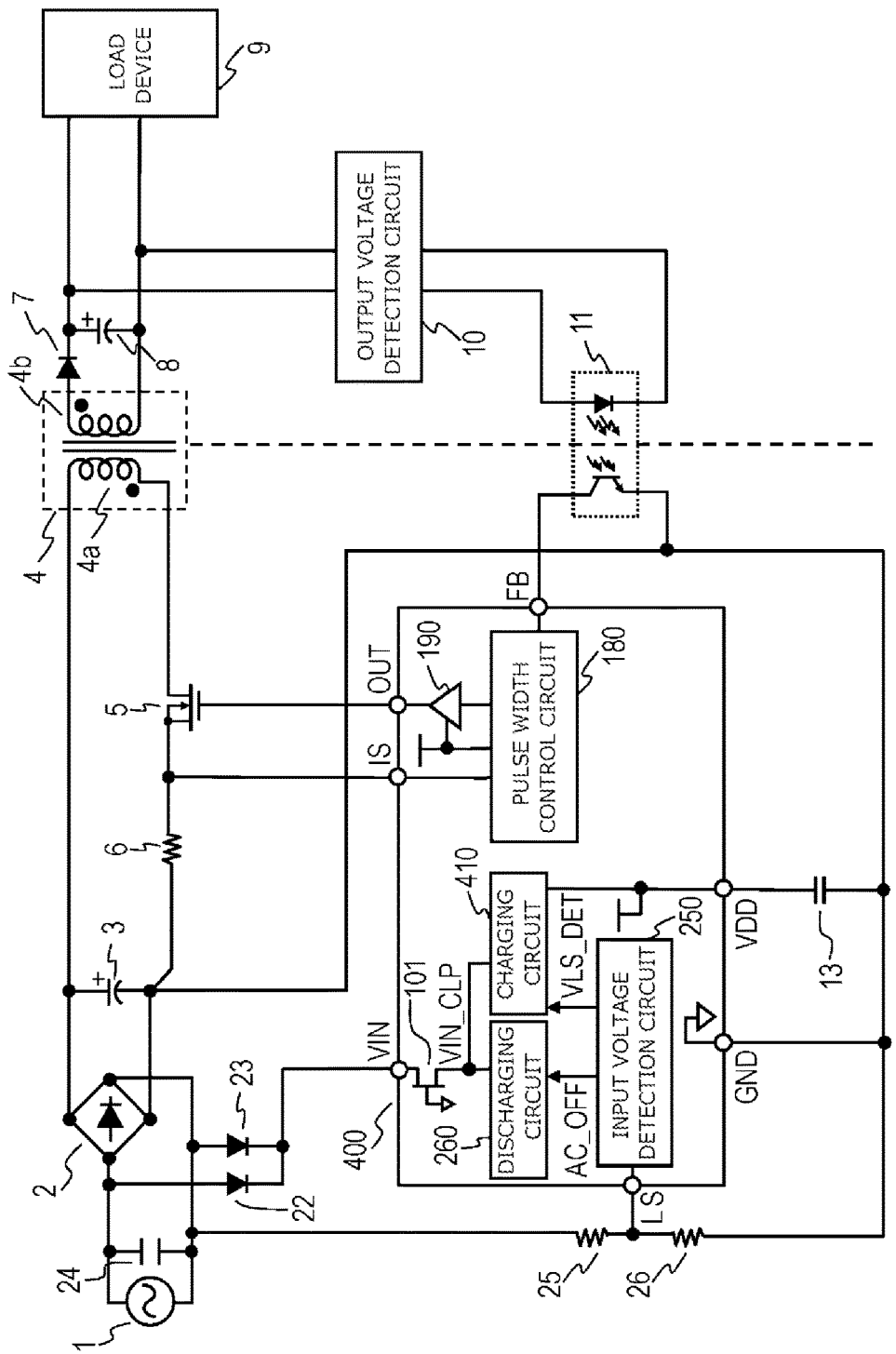
FIG. 17 is a circuit diagram illustrating one configuration of a switching power supply device including a direct current power supply circuit according to a fourth exemplary embodiment.
Figure 18:
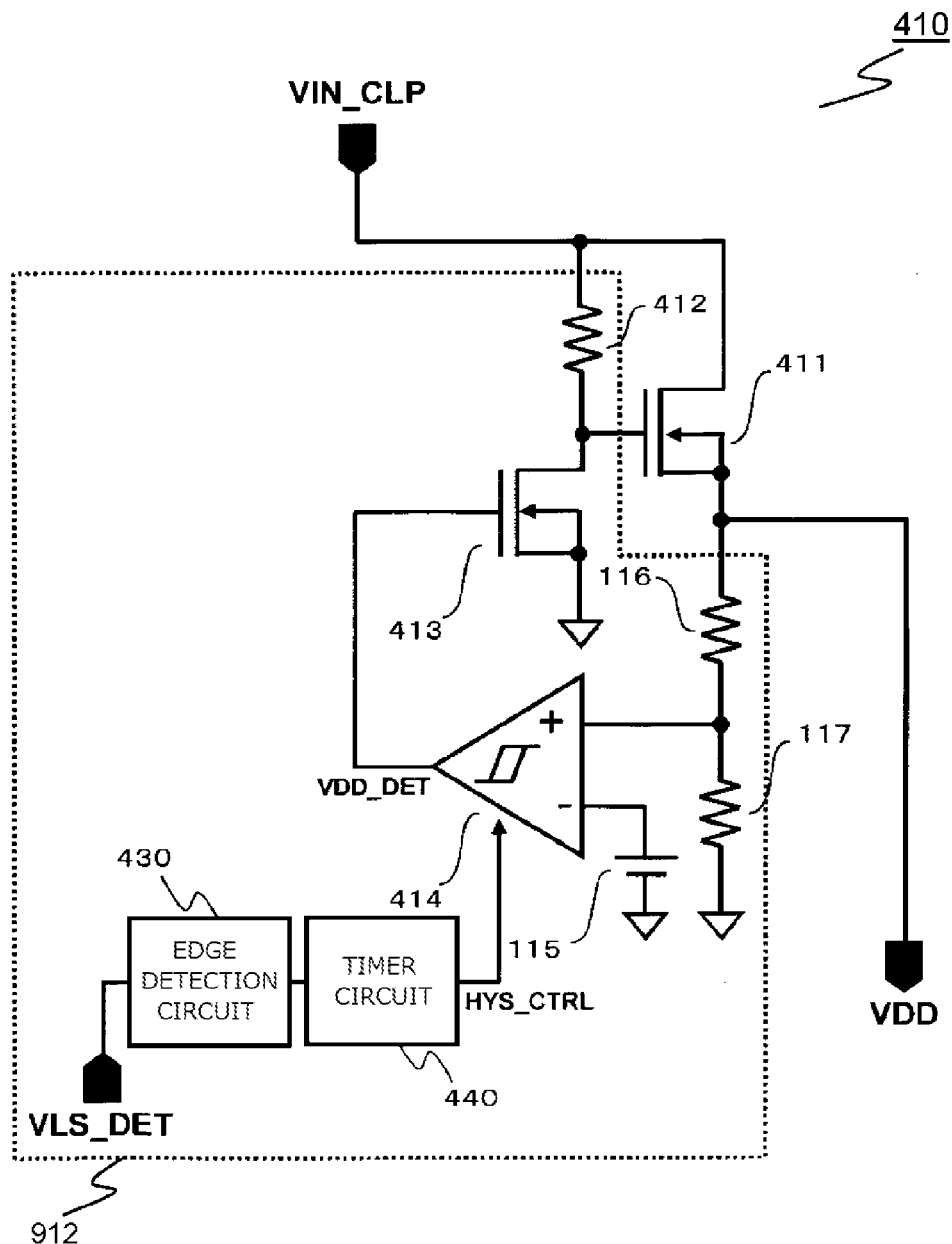
FIG. 18 is a circuit diagram illustrating one configuration of a charging circuit according to the fourth exemplary embodiment.

FIG. 17 is a circuit diagram illustrating one configuration of a switching power supply device including the direct current power supply circuit according to the present fourth exemplary embodiment. Compared to FIG. 8 illustrating the configuration of the switching power supply device including the direct current power supply circuit according to the second exemplary embodiment, SWC circuit 400 is different. The description overlapping with the second exemplary embodiment will not be repeated below.

SWC circuit 400 according to the fourth exemplary embodiment includes JFET 101, charging circuit 410, PLSWC circuit 180, drive circuit 190, IVD circuit 250, and discharging circuit 260.

Charging circuit 410 receives input clamp voltage signal VIN_CLP and supplies power to SWC circuit 400 and smoothing capacitor 13 connected to the VDD terminal. For example, charging circuit 410 includes N-type MOSFETs 411 and 413, resistors 412, 116, and 117, HYS comparator 414, reference voltage source 115, edge detection circuit 430, and timer circuit 440 as illustrated in FIG. 18, and has functions corresponding to charging switch 911 and CSWC circuit 912 in FIG. 1.

The operation of the switching power supply device thus configured according to the fourth exemplary embodiment will be described below mainly about the different points from the second exemplary embodiment.

When VLS detection signal VLS_DET signal is input to charging circuit 410 from IVS circuit 250, HYSC signal HYS_CTRL becomes a high level during a predetermined period (e.g., 1 ms) in which VLS detection signal VLS_DET is changed from a high level to a low level by edge detection circuit 430 and timer circuit 440. HYSC signal HY_CTRL is a signal for controlling a hysteresis width of HYS comparator 414. First reference voltage VDD_L is set to be high (e.g., it is changed from 4.5 V to 4.9 V) so as to decrease the hysteresis width during the period in which HYSC signal HYS_CTRL has a high level. Specifically, first reference voltage VDD_L becomes higher than the VDD terminal voltage during this period, so that the charging period is set.

The charging period set by timer circuit 440 is set (e.g., 1 ms) to be longer than the charging time of smoothing capacitor 13 connected to the VDD terminal and also set such that the VIN terminal voltage becomes not too high.

Figure 19:
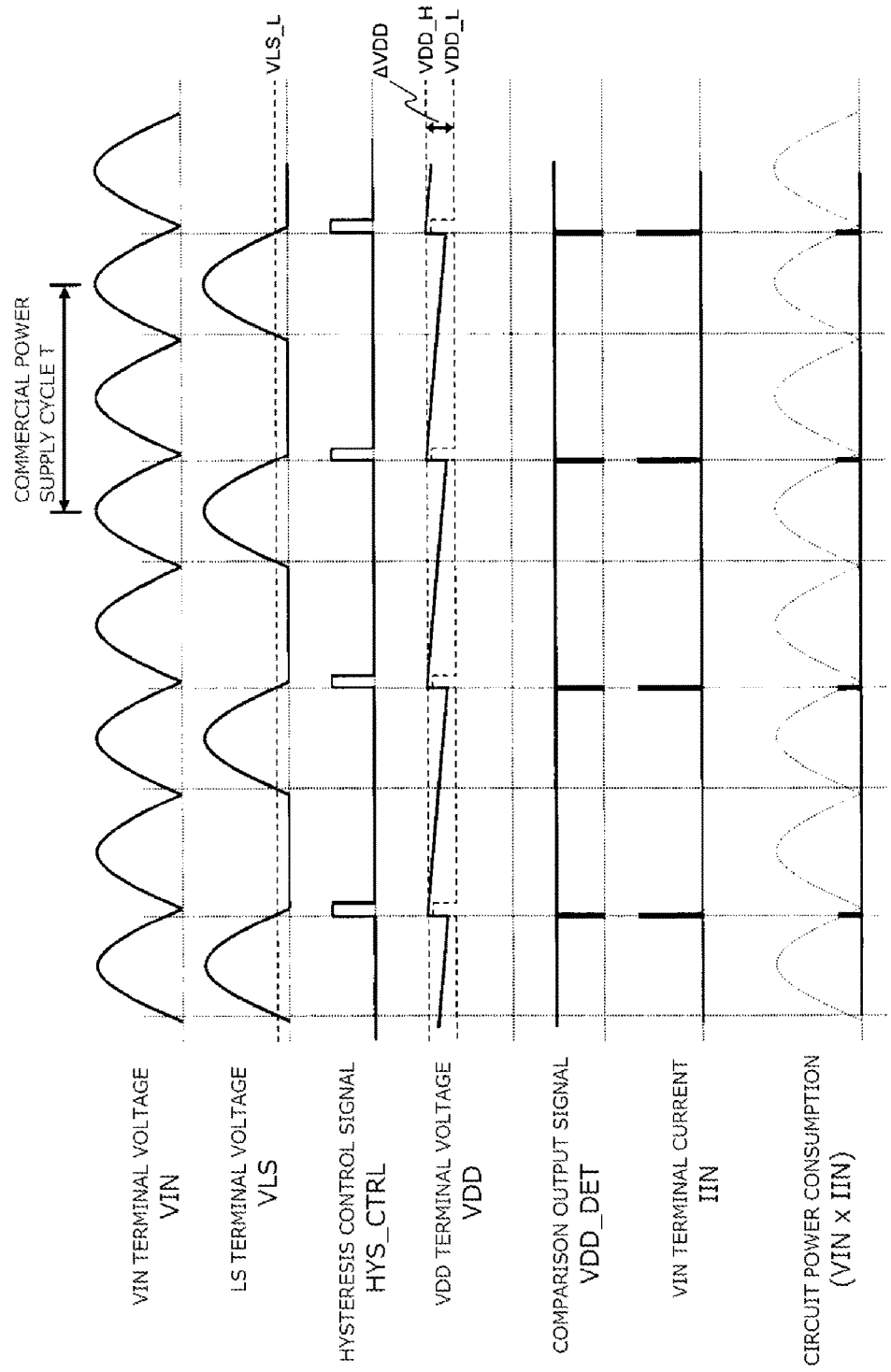
FIG. 19 is a timing chart for describing the operation of the direct current power supply circuit according to the fourth exemplary embodiment.

FIG. 19 is a timing chart for describing the operation of the direct current power supply circuit according to the fourth exemplary embodiment.

In FIG. 19, when a VLS terminal voltage lowers and VLS detection signal VLS_DET becomes a low level, HYSC signal HYS_CTRL becomes a high level, and first reference voltage VDD_L becomes higher than the VDD terminal voltage. With this, comparison output signal VDD_DET becomes a low level. With this, N-type MOSFET 411 is turned on, whereby power supply to SWC circuit 400 and smoothing capacitor 13 connected to the VDD terminal is immediately started. In this case, the circuit power consumption is reduced, because the VIN terminal voltage is sufficiently low (e.g., 20 V) corresponding to third reference voltage VLS_L.

From the above, the direct current power supply circuit according to the present exemplary embodiment and the switching power supply device including the direct current power supply circuit can easily reduce power supplied to various control circuits with various specifications having different circuit current only by adjusting the hysteresis width of HYS comparator 414 or smoothing capacitor 13 externally connected to the VDD terminal according to the circuit current of SWC circuit 400, even when the voltage applied to the VIN terminal is a full-wave rectified voltage in order to implement the discharging function of X capacitor 24.

If comparison output signal VDD_DET becomes a low level and the VIN terminal voltage exceeds the VDD terminal voltage even when the VDD terminal voltage abnormally lowers due to an increase in consumption current of SWC circuit 400, charging is immediately started.

In a transient area where the circuit current changes, such as upon a start or upon a change in a switching operation, the charging period may not be set with VLS detection signal VLS_DET, and therefore, the effect of reducing power consumption may be unnecessary.

It is also to be noted that VLS detection signal VLS_DET in synchronization with the cycle of commercial power supply 1 may be generated from a full-wave rectified voltage signal, such as a VIN terminal voltage, with a divider circuit without using the LS terminal.

Fifth Exemplary Embodiment

Next, a direct current power supply circuit according to a fifth exemplary embodiment and a switching power supply device including the direct current power supply circuit will next be described with reference to FIGS. 20 to 23.

The first exemplary embodiment describes the switching power supply device in which the consumption current of the SWC is not so greatly changed. On the other hand, the fifth exemplary embodiment describes the configuration of a switching power supply device having a normal power mode and a low-power mode, which are switched to greatly change consumption current of a SWC circuit.

Figure 20:
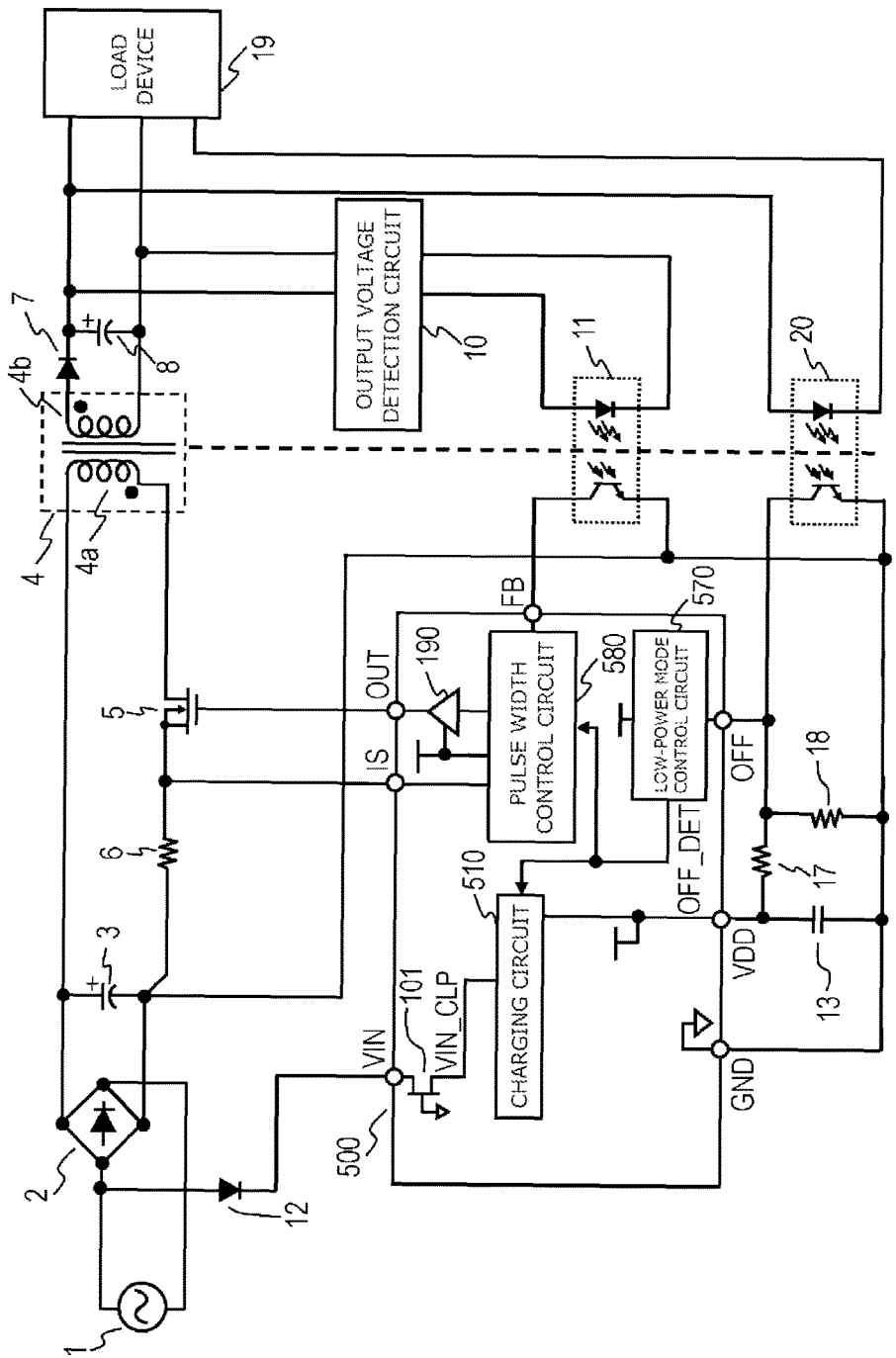
FIG. 20 is a circuit diagram illustrating one configuration of a switching power supply device including a direct current power supply circuit according to a fifth exemplary embodiment.

FIG. 20 is a circuit diagram illustrating one configuration of a switching power supply device including the direct current power supply circuit according to the present fifth exemplary embodiment. Compared to FIG. 2 illustrating the configuration of the switching power supply device including the direct current power supply circuit according to the first exemplary embodiment, SWC circuit 500 having a function of switching the normal power mode and the low-power mode with a mode switching signal from a load device 19 and the peripheral circuit of SWC circuit 500 are different. The description overlapping with the first exemplary embodiment will not be repeated below.

SWC circuit 500 according to the fifth exemplary embodiment includes an OFF terminal as an external input terminal, and includes JFET 101, charging circuit 510, PLSWC circuit 580, drive circuit 190, and low-power mode control (hereinafter referred to as LPMC) circuit 570.

The OFF terminal is connected to resistors 17 and 18 connected between the VDD terminal and the GND terminal. A mode switching signal is input to the OFF terminal from load device 19 via photocoupler 20.

Figure 21:
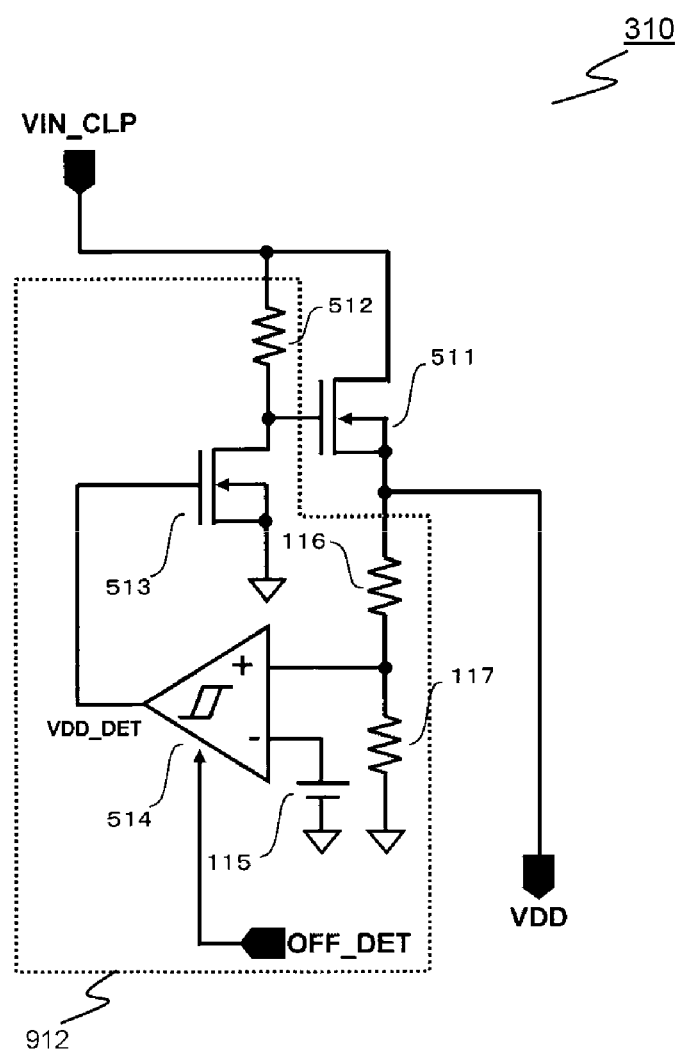
FIG. 21 is a circuit diagram illustrating one configuration of a charging circuit according to the fifth exemplary embodiment.

Charging circuit 510 receives input clamp voltage signal VIN_CLP and supplies power to SWC circuit 500 and smoothing capacitor 13 connected to the VDD terminal. For example, charging circuit 510 includes N-type MOSFETs 511 and 513, resistors 512, 116, and 117, HYS comparator 514, and reference voltage source 115 as illustrated in FIG. 21, and has functions corresponding to charging switch 911 and CSWC circuit 912 in FIG. 1.

PLSWC circuit 580 outputs a signal for controlling switching element 5 to drive circuit 190 based on signals from the FB terminal and the IS terminal. PLSWC circuit 580 has a function of reducing consumption current by stopping a signal output to switching element 5 in the low-power mode.

Figure 22:
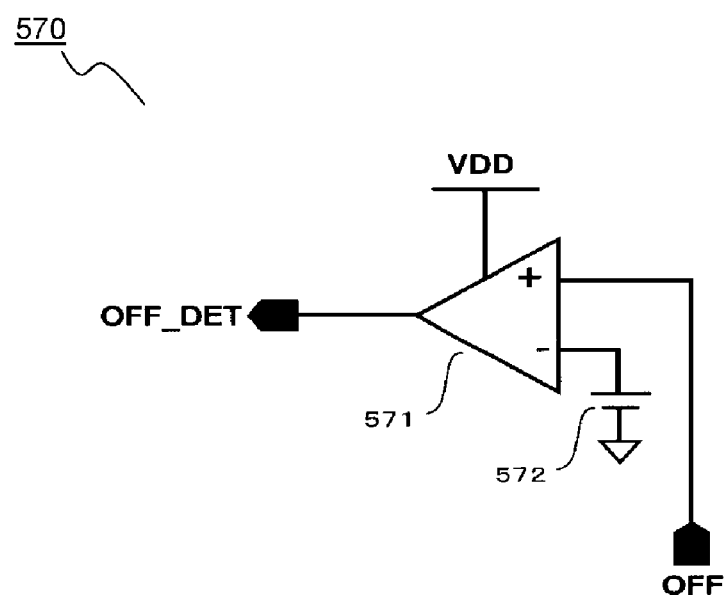
FIG. 22 is a circuit diagram illustrating one configuration of an off-mode control circuit according to the fifth exemplary embodiment.

LPMC circuit 570 outputs low-power mode detection signal OFF_DET to charging circuit 510 and PLSWC circuit 580 based on the mode switching signal input from the OFF terminal. For example, LPMC circuit 570 includes comparator 571 and reference voltage source 572 as illustrated in FIG. 22.

The operation of the switching power supply device thus configured according to the fourth exemplary embodiment will be described below mainly about the different points from the first exemplary embodiment.

A half-wave rectified voltage rectified by rectification diode 12 is applied to the VIN terminal of SWC circuit 500, whereby power is supplied to SWC circuit 500 and smoothing capacitor 13 connected to the VDD terminal via JFET 101 and charging circuit 510.

LPMC circuit 570 compares an OFF terminal voltage and reference voltage source 572 with comparator 571. LPMC circuit 570 outputs a high-level signal as low-power mode detection signal OFF_DET, when the OFF terminal voltage is equal to or higher than fifth reference voltage VOFF_H (e.g., 1 V).

In the normal power mode, load device 19 drives photocoupler 20, so that the OFF terminal voltage becomes equal to or lower than fifth reference voltage VOFF_H. Therefore, low-power mode detection signal OFF_DET is in a low level, and therefore, the operation similar to the first exemplary embodiment is performed.

In the low-power mode, the drive of photocoupler 20 by load device 19 is stopped, so that the OFF terminal voltage rises to a voltage value (e.g., 3 V) obtained by dividing the VDD terminal voltage by resistors 17 and 18. Low-power mode detection signal OFF_DET becomes a high level, and PLSWC circuit 580 reduces circuit current IDD (e.g., reduces circuit current IDD to 2 µA from 10 µA) of SWC circuit 500 by stopping the signal output to switching element 5. On the other hand, HYS comparator 514 in charging circuit 510 sets first reference voltage VDD_L to be higher (e.g., changes VDD_L to 4.9 V from 4.5 V) so as to reduce the hysteresis width. As a result, period requiring no charging TOFF in the low-power mode becomes 16.5 ms which satisfies the above equation (2), when CVDD=0.33 µf and cycle T of commercial power supply 1 is 20 ms. Therefore, in every charging timing, charging is started during the period in which the VIN terminal voltage rises to exceed the VDD terminal voltage, and charging is ended during the period in which the VIN terminal voltage is low. Accordingly, the circuit power consumption is reduced.

Figure 23:
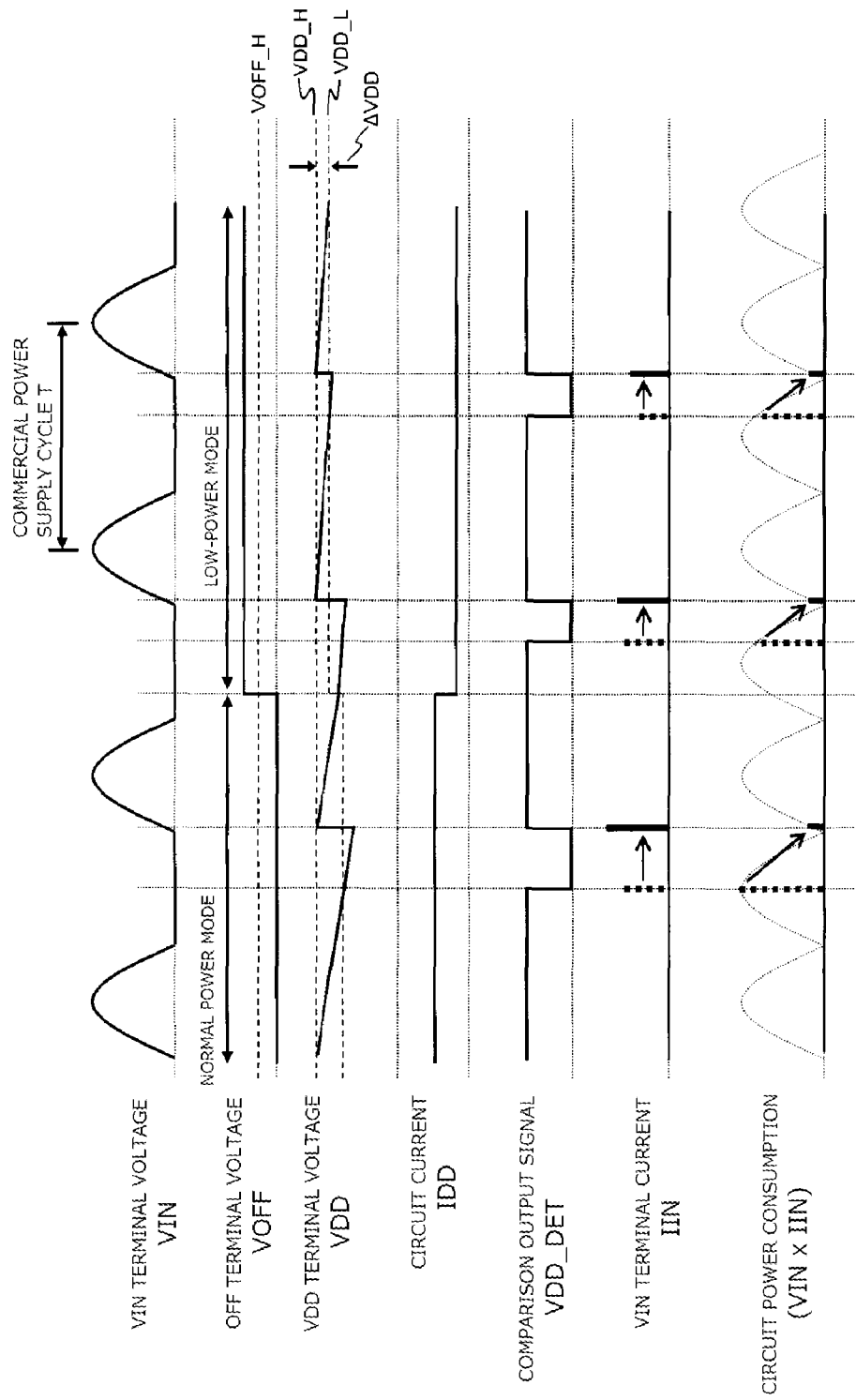
FIG. 23 is a timing chart for describing the operation of the direct current power supply circuit according to the fifth exemplary embodiment.

FIG. 23 is a timing chart for describing the operation of the direct current power supply circuit according to the fifth exemplary embodiment. This chart illustrates the case in which the charging interval becomes equal to the alternating-current voltage cycle, in each of the normal power mode and the low-power mode.

In FIG. 23, the timing at which the VDD terminal voltage lowers and comparison output signal VDD_DET becomes a low level is in the non-charging period in which the VIN terminal voltage is 0 V. Therefore, in every charging timing, charging is started during the period in which the VIN terminal voltage rises to exceed the VDD terminal voltage, and charging is ended during the period in which the VIN terminal voltage is low. Accordingly, the circuit power consumption is reduced.

When the OFF terminal voltage becomes higher than fifth reference voltage VOFF_H due to the mode switching signal from load device 19, circuit current IDD of SWC circuit 500 is reduced, and the hysteresis width of HYS comparator 514 is set to be small.

From the above, the direct current power supply circuit according to the present exemplary embodiment and the switching power supply device including the direct current power supply circuit does not need to monitor the VIN terminal voltage, thereby reducing power supplied to SWC circuit 500. In addition, the hysteresis width of HYS comparator 514 or smoothing capacitor 13 externally connected to the VDD terminal is only adjusted according to the circuit current of SWC circuit 500, and further, the direct current power supply circuit can respond to the change in the circuit current with the mode switching. Accordingly, the direct current power supply circuit according to the present exemplary embodiment can easily be applied to various control circuits with various specifications having different circuit current.

If comparison output signal VDD_DET becomes a low level and the VIN terminal voltage exceeds the VDD terminal voltage even when the VDD terminal voltage abnormally lowers due to an increase in consumption current of SWC circuit 500, charging is immediately started. In addition, a margin can be set to the abnormal decrease in the VDD terminal voltage relative to each mode.

The present exemplary embodiment describes the case in which comparison output signal VDD_DET becomes a low level during the non-charging period in which the VIN terminal voltage is 0 V in both the normal power mode and the low-power mode. However, the charging period in the normal power mode may be longer or shorter than in the low-power mode. Further, a timing at which comparison output signal VDD_DET becomes a low level may not appear during the non-charging period in which the VIN terminal voltage is 0 V, and therefore, the effect of reducing power consumption may be unnecessary.

Notably, comparator 571 in LPMC circuit 570 may have hysteresis for preventing malfunction caused by noise of the OFF terminal voltage.

Sixth Exemplary Embodiment

Next, a direct current power supply circuit according to a sixth exemplary embodiment and a switching power supply device including the direct current power supply circuit will next be described with reference to FIGS. 24 to 26.

The fifth exemplary embodiment describes the switching power supply device in which the power supply voltage terminal is only the VDD terminal. On the other hand, the sixth exemplary embodiment describes the configuration of a switching power supply device having a first power supply voltage terminal (VDD terminal) and a second power supply voltage terminal (VCC terminal), and has a mode switching function between a normal power mode using two power supply voltage terminals and a low-power mode using only the first power supply voltage terminal.

Figure 24:
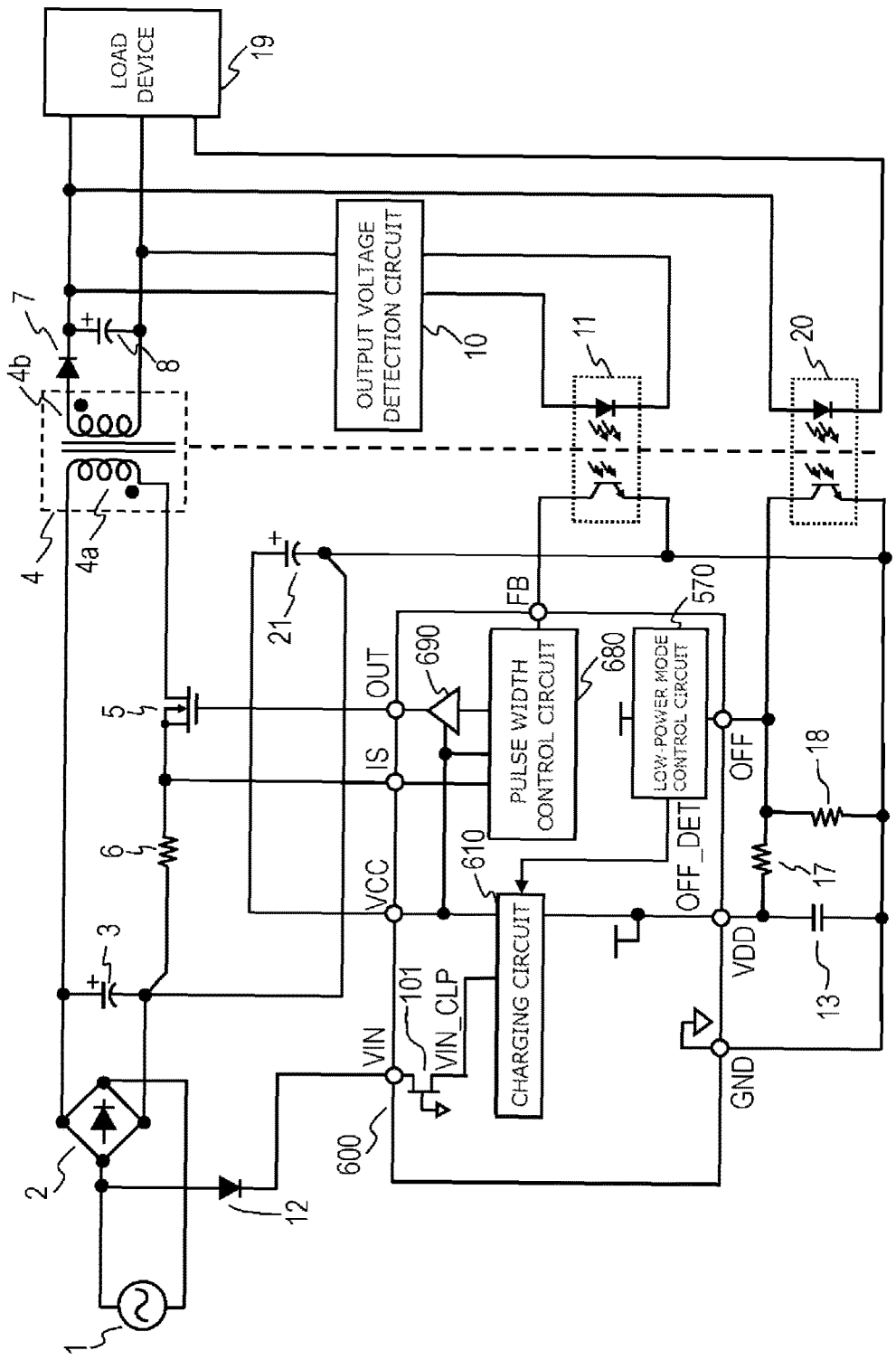
FIG. 24 is a circuit diagram illustrating one configuration of a switching power supply device including a direct current power supply circuit according to a sixth exemplary embodiment.
Figure 25:
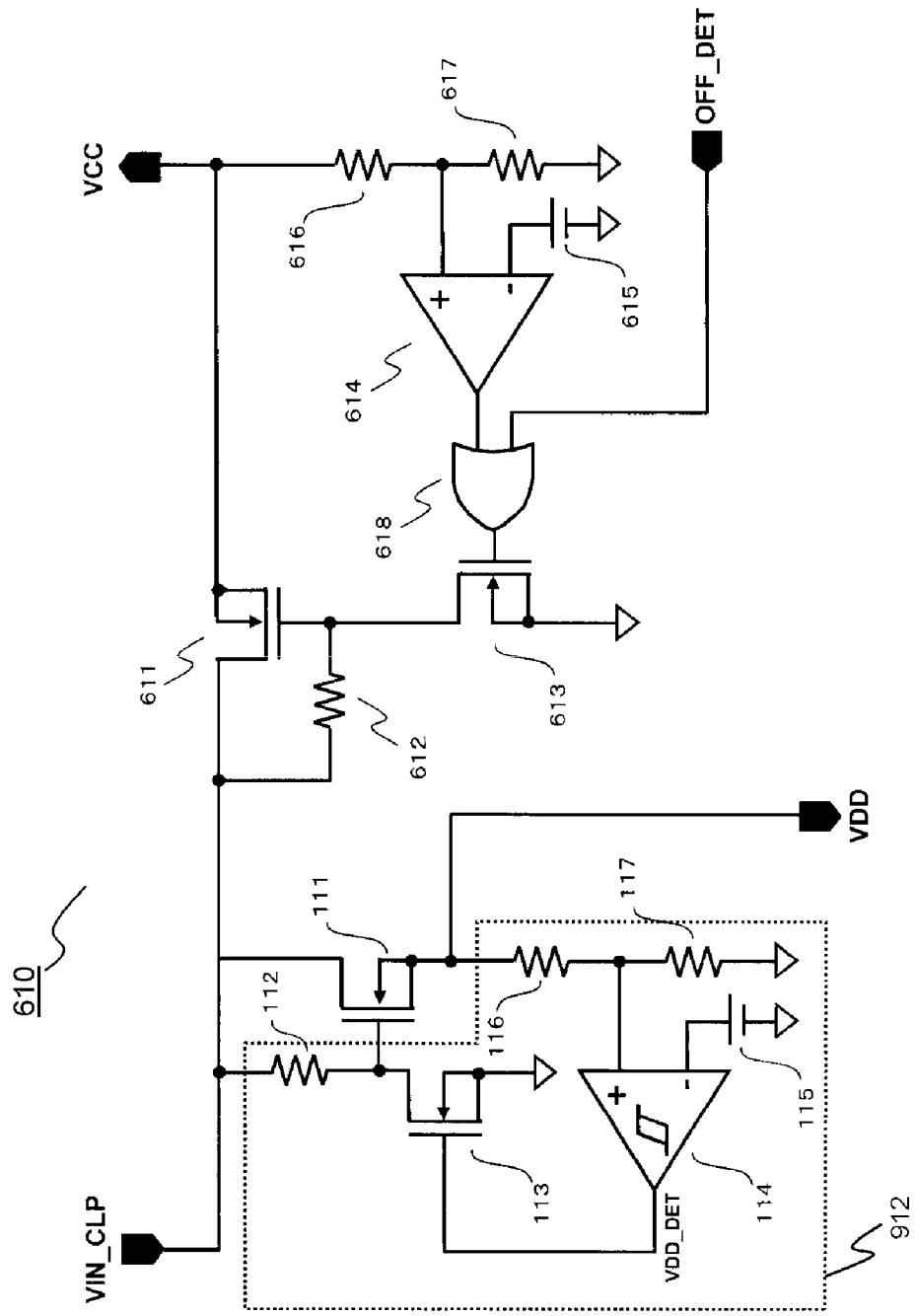
FIG. 25 is a circuit diagram illustrating one configuration of a charging circuit according to the sixth exemplary embodiment.

FIG. 24 is a circuit diagram illustrating one configuration of a switching power supply device including the direct current power supply circuit according to the present sixth exemplary embodiment. Compared to FIG. 20 illustrating the configuration of the switching power supply device including the direct current power supply circuit according to the fifth exemplary embodiment, SWC circuit 600 having a function of switching the normal power mode and the low-power mode with a mode switching signal from load device 19 and the peripheral circuit of SWC circuit 600 are different. The description overlapping with the fifth exemplary embodiment will not be repeated below.

SWC circuit 600 according to the sixth exemplary embodiment further includes a VCC terminal as an external input/output terminal, and includes JFET 101, charging circuit 610, PLSWC circuit 680, drive circuit 690, and LPMC circuit 570.

The VCC terminal is the second power supply voltage terminal of SWC circuit 600. Smoothing capacitor 21 is connected to the VCC terminal. The VCC terminal is a terminal capable of stably supplying power to PLSWC circuit 680 and drive circuit 690 without causing a VCC terminal voltage to be reduced to an operating stop voltage.

Charging circuit 610 receives input clamp voltage signal VIN_CLP and supplies power to SWC circuit 600, smoothing capacitor 13 connected to the VDD terminal, and smoothing capacitor 21 connected to the VCC terminal. For example, charging circuit 610 includes N-type MOSFETs 111, 113, 611, and 613, resistors 112, 116, 117, 612, 616, and 617, HYS comparator 114, reference voltage sources 115 and 615, comparator 614, and OR circuit 618, and has functions corresponding to charging switch 911 and CSWC circuit 912 in FIG. 25.

PLSWC circuit 680 outputs a signal for controlling switching element 5 to drive circuit 690 based on signals from the FB terminal and the IS terminal. Power is supplied to PLSWC circuit 680 and drive circuit 690 from the VCC terminal.

LPMC circuit 570 outputs low-power mode detection signal OFF_DET to charging circuit 610 based on the mode switching signal input from the OFF terminal, and power is supplied from the VDD terminal.

The operation of the switching power supply device thus configured according to the sixth exemplary embodiment will be described below mainly about the different points from the fifth exemplary embodiment.

A half-wave rectified voltage rectified by rectification diode 12 is applied to the VIN terminal of SWC circuit 600, whereby power is supplied to SWC circuit 600, smoothing capacitor 13 connected to the VDD terminal, and smoothing capacitor 21 connected to the VCC terminal via JFET 101 and charging circuit 610.

The VCC terminal voltage is divided by resistors 616 and 617, input to HYS comparator 614, and is compared to reference voltage source 615. In the normal power mode, low-power mode detection signal OFF_DET is in a low level, and N-type MOSFETs 611 and 613 perform on/off operation so as to keep the VCC terminal voltage at sixth reference voltage VCC_H (e.g., 15 V).

In the low-power mode, high-level low-power mode detection signal OFF_DET is input to OR circuit 618, and N-type MOSFET 611 is forcibly turned off. Since power is not supplied to the VCC terminal, the VCC terminal voltage keeps lowering to an operation stop voltage (e.g., 10 V), and PLSWC circuit 680 stops the switching operation of switching element 5. PLSWC circuit 680 and drive circuit 690 are typically circuits having large circuit current in SWC circuit 600. Therefore, the circuit current is greatly reduced in the low-power mode.

Figure 26:
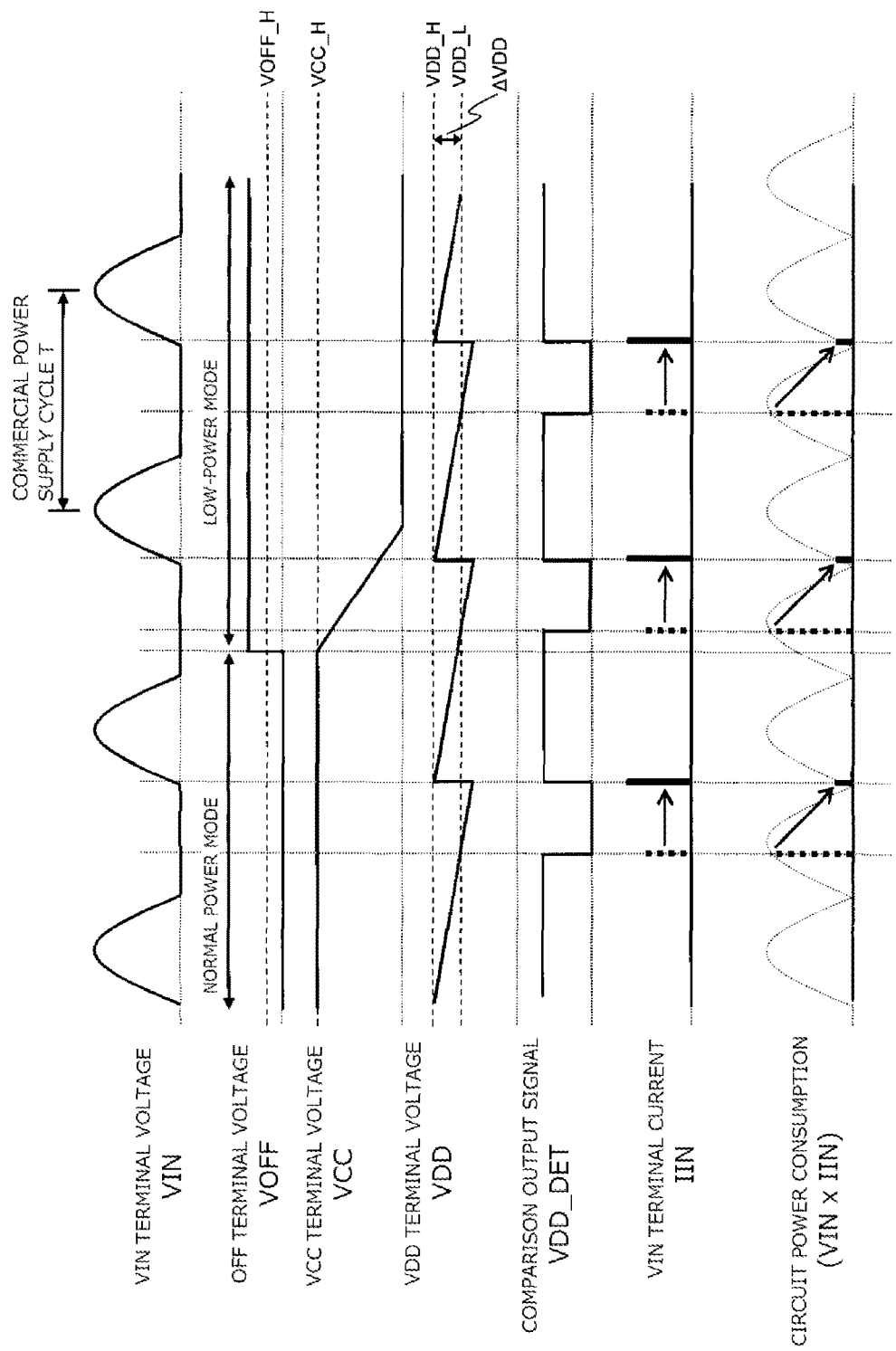
FIG. 26 is a timing chart for describing the operation of the direct current power supply circuit according to the sixth exemplary embodiment.

FIG. 26 is a timing chart for describing the operation of the direct current power supply circuit according to the sixth exemplary embodiment. This chart illustrates that the charging interval is equal to the alternating-current voltage cycle for the VDD terminal voltage.

In FIG. 26, the timing at which the VDD terminal voltage lowers and comparison output signal VDD_DET becomes a low level is in the non-charging period in which the VIN terminal voltage is 0 V. Therefore, in every charging timing, charging is started during the period in which the VIN terminal voltage rises to exceed the VDD terminal voltage, and charging is ended during the period in which the VIN terminal voltage is low. Accordingly, the circuit power consumption is reduced.

When the OFF terminal voltage becomes higher than fifth reference voltage VOFF_H due to the mode switching signal from load device 19, the mode becomes the low-power mode, so that the VCC terminal voltage lowers.

From the above, the direct current power supply circuit according to the present exemplary embodiment and the switching power supply device including the direct current power supply circuit does not need to monitor the VIN terminal voltage, thereby reducing power supplied to SWC circuit 600. In addition, the hysteresis width of HYS comparator 114 or smoothing capacitor 13 externally connected to the VDD terminal is only adjusted according to the circuit current of SWC circuit 600 consumed via the VDD terminal, and further, the direct current power supply circuit can easily respond to the change in the circuit current with the mode switching. Accordingly, the direct current power supply circuit according to the present exemplary embodiment can easily be applied to various control circuits with various specifications having different circuit current.

If comparison output signal VDD_DET becomes a low level and the VIN terminal voltage exceeds the VDD terminal voltage even when the VDD terminal voltage abnormally lowers due to an increase in consumption current of SWC circuit 600, charging is immediately started.

The present exemplary embodiment describes the case in which comparison output signal VDD_DET becomes a low level during the non-charging period in which the VIN terminal voltage is 0 V in both the normal power mode and the low-power mode. However, the charging period in the normal power mode may be longer or shorter than in the low-power mode. Further, a timing at which comparison output signal VDD_DET becomes a low level may not appear during the non-charging period in which the VIN terminal voltage is 0 V, and therefore, the effect of reducing power consumption may be unnecessary.

Notably, comparator 614 in charging circuit 610 may have hysteresis for stably controlling the charging to smoothing capacitor 21 connected to the VCC terminal.

Seventh Exemplary Embodiment

Next, a direct current power supply circuit according to a seventh exemplary embodiment and a switching power supply device including the direct current power supply circuit will next be described with reference to FIGS. 27 and 28.

The fourth exemplary embodiment describes the switching power supply device in which the power supply voltage terminal is only the VDD terminal. On the other hand, the seventh exemplary embodiment describes the configuration of a switching power supply device having a first power supply voltage terminal (VDD terminal) and a second power supply voltage terminal (VCC terminal), and has a mode switching function between a normal power mode using two power supply voltage terminals and a low-power mode using only the first power supply voltage terminal.

Figure 27:
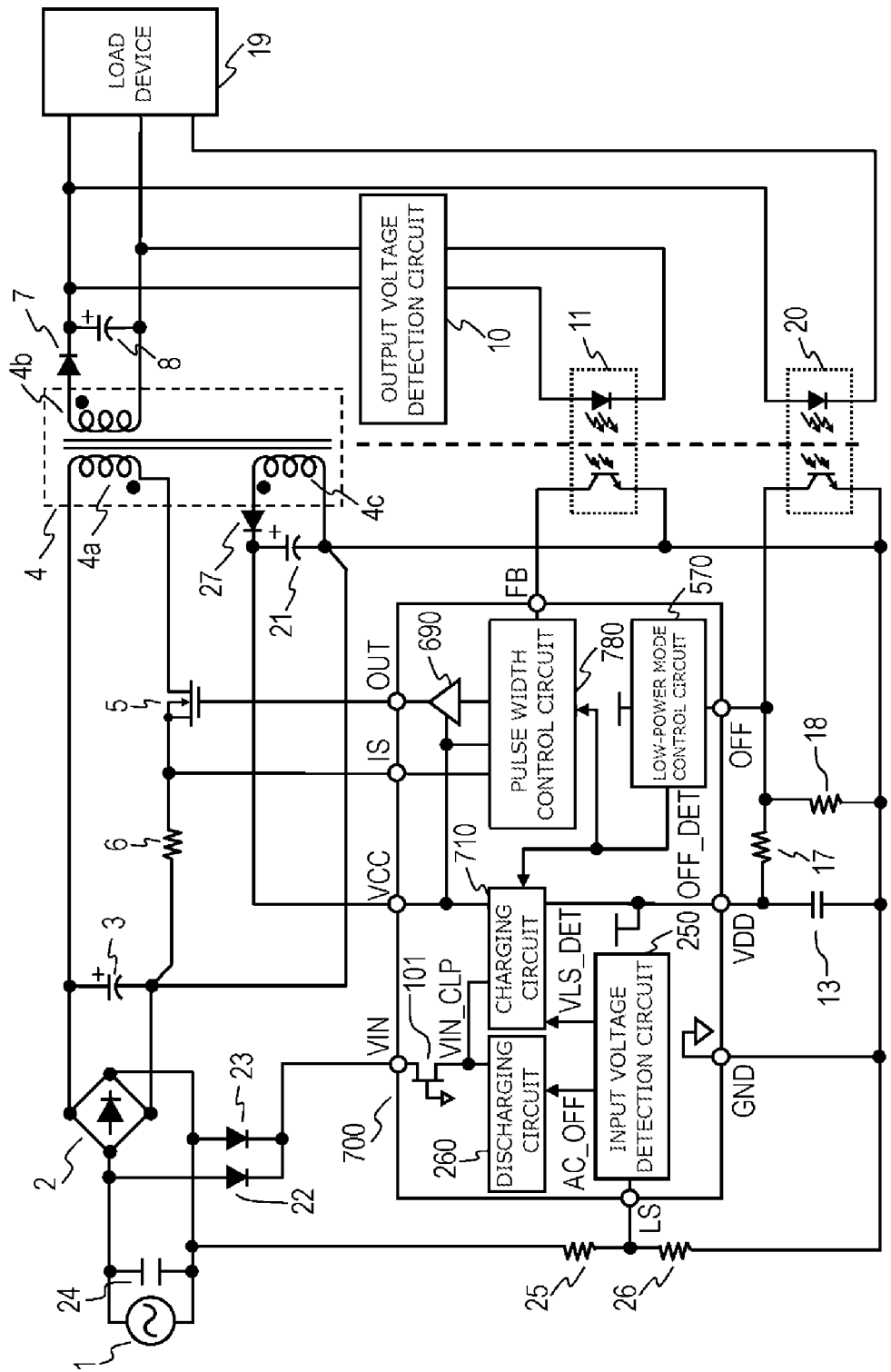
FIG. 27 is a circuit diagram illustrating one configuration of a switching power supply device including a direct current power supply circuit according to a seventh exemplary embodiment.
Figure 28:
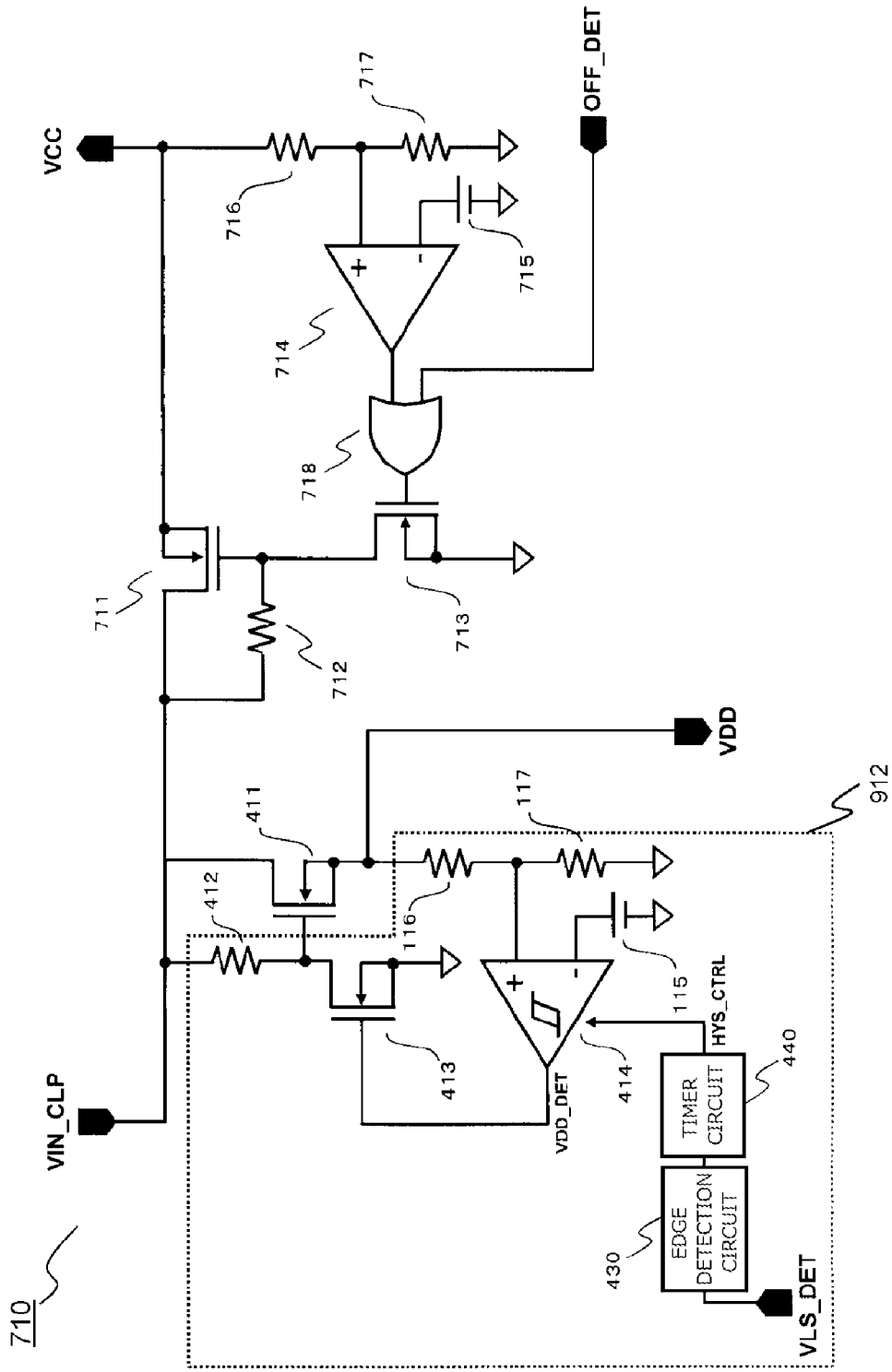
FIG. 28 is a circuit diagram illustrating one configuration of a charging circuit according to the seventh exemplary embodiment.

FIG. 27 is a circuit diagram illustrating one configuration of a switching power supply device including the direct current power supply circuit according to the present seventh exemplary embodiment. Compared to FIG. 17 illustrating the configuration of the switching power supply device including the direct current power supply circuit according to the fourth exemplary embodiment, SWC circuit 700 having a function of switching the normal power mode and the low-power mode with a mode switching signal from load device 19 and the peripheral circuit of SWC circuit 700 are different. The description overlapping with the fourth exemplary embodiment will not be repeated below.

In FIG. 27, transformer 4 has primary coil 4a, secondary coil 4b, and auxiliary coil 4c. Auxiliary coil 4c and secondary coil 4b have the same polarity.

Rectification diode 27 and smoothing capacitor 21 are connected to auxiliary coil 4c to supply power to SWC circuit 700.

SWC circuit 700 in the switching power supply device further includes a VCC terminal as an external input/output terminal, and includes JFET 101, charging circuit 710, PLSWC circuit 780, drive circuit 690, IVD circuit 250, discharging circuit 260, and LPMC circuit 570.

The VCC terminal is the second power supply voltage terminal of SWC circuit 700. Smoothing capacitor 21 is connected to the VCC terminal. The VCC terminal is a terminal capable of stably supplying power to PLSWC circuit 780 and drive circuit 690 without causing the VCC terminal voltage to be reduced to an operating stop voltage. In the normal power mode in which switching element 5 performs a switching operation, power is supplied from auxiliary coil 4c of transformer 4.

Charging circuit 710 receives input clamp voltage signal VIN_CLP and supplies power to SWC circuit 700, smoothing capacitor 13 connected to the VDD terminal, and smoothing capacitor 21 connected to the VCC terminal. For example, charging circuit 710 includes N-type MOSFETs 411, 413, 711, and 713, resistors 412, 116, 117, 712, 716, and 717, HYS comparator 414, reference voltage sources 115 and 715, edge detection circuit 430, timer circuit 440, comparator 714, and OR circuit 718, and has functions corresponding to charging switch 911 and CSWC circuit 912 in FIG. 28.

PLSWC circuit 780 outputs a signal for controlling switching element 5 to drive circuit 690 based on signals from the FB terminal and the IS terminal. Power is supplied to PLSWC circuit 780 and drive circuit 690 from the VCC terminal.

LPMC circuit 570 outputs low-power mode detection signal OFF_DET to charging circuit 710 based on the mode switching signal input from the OFF terminal, and power is supplied from the VDD terminal.

The operation of the switching power supply device thus configured according to the seventh exemplary embodiment will be described below mainly about the different points from the fourth exemplary embodiment.

A full-wave rectified voltage rectified by rectification diodes 22 and 23 is applied to the VIN terminal of SWC circuit 700, whereby power is supplied to SWC circuit 700, smoothing capacitor 13 connected to the VDD terminal, and smoothing capacitor 21 connected to the VCC terminal via JFET 101 and charging circuit 710.

The VCC terminal voltage is divided by resistors 716 and 717, input to HYS comparator 714, and is compared to reference voltage source 715. In the normal power mode, low-power mode detection signal OFF_DET is in a low level, and N-type MOSFETs 711 and 713 perform on/off operation so as to keep the VCC terminal voltage to be equal to or higher than sixth reference voltage VCC_H (e.g., 20 V). However, in the normal power mode in which switching element 5 performs a switching operation, except for the timing just after the start, power is supplied from auxiliary coil 4c of transformer 4. A flyback voltage appearing in auxiliary coil 4c is rectified and smoothed, whereby a low stable voltage (e.g., 20 V) can be supplied to the VCC terminal. Therefore, N-type MOSFET 711 keeps its off-state, and power is not supplied from the VIN terminal to VCC.

In the low-power mode, PLSWC circuit 780 receives high-level low-power mode detection signal OFF_DET to stop the switching operation of switching element 5. The power supply from auxiliary coil 4c of transformer 4 is also stopped due to the stop of the switching operation, so that a VCC voltage lowers. In addition, high-level low-power mode detection signal OFF_DET is input to OR circuit 718 in charging circuit 710, and N-type MOSFET 711 is forcibly turned off. With this, power is not supplied to the VCC terminal, whereby the VCC terminal voltage keeps lowering. PLSWC circuit 780 and drive circuit 690 are typically circuits having large circuit current in SWC circuit 700. Therefore, the circuit current is greatly reduced in the low-power mode.

From the above, the direct current power supply circuit according to the present exemplary embodiment and the switching power supply device including the direct current power supply circuit can reduce power supplied to SWC circuit 700, even if the voltage applied to the VIN terminal is a full-wave rectified voltage in order to implement the discharging function of X capacitor 24. In addition, the hysteresis width of HYS comparator 414 or smoothing capacitor 13 externally connected to the VDD terminal is only adjusted according to the circuit current of SWC circuit 700 consumed via the VDD terminal, and further, the direct current power supply circuit can easily respond to the change in the circuit current with the mode switching. Accordingly, the direct current power supply circuit according to the present exemplary embodiment can easily be applied to various control circuits with various specifications having different circuit current.

If comparison output signal VDD_DET becomes a low level and the VIN terminal voltage exceeds the VDD terminal voltage even when the VDD terminal voltage abnormally lowers due to an increase in consumption current of SWC circuit 700, charging is immediately started.

In addition, in the normal power mode, power is stably supplied from auxiliary coil 4c of transformer 4, whereby a power loss can be reduced.

Notably, a step-down regulator may be added between the VCC terminal and the VDD terminal to supply power from the VCC terminal to the VDD terminal in the normal power mode.

In each of the above embodiments and modifications, 0 V of a direct-current voltage (VIN terminal voltage) actually depend on an alternating-current voltage, the VDD terminal voltage, and full wave or half wave. Therefore, it includes a certain range, and does not indicate 0 V in a strict sense. Specifically, 0 V of a direct-current voltage might include the range from 0 V to 5 V. The voltage values and periods described above may include some errors. These values are only illustrative, and not limited to the illustrated values, but can appropriately be set.

The first to seventh exemplary embodiments and their modifications have been described above as illustrative examples of the technique in the present disclosure. However, the technique in the present disclosure is not limited to these, and can be applied to embodiments in which various changes, replacements, additions, omissions, etc., are made. Furthermore, an embodiment to which various modifications that would be made by a person skilled in the art are performed, and an embodiment formed by combining each component in two or more exemplary embodiments are included in the technical scope of the present disclosure without departing from the scope of the technique in the present disclosure.

The exemplary embodiments and modifications have been described above as illustrative example of the technique in the present disclosure. The accompanying drawings and the detailed description are provided for this purpose.

Thus, elements appearing in the accompanying drawings and the detailed description include not only those that are essential to solve the technical problems set forth herein, but also those that are not essential to solve the technical problems but are merely used to illustrate the technique disclosed herein. Therefore, those non-essential elements should not immediately be taken as being essential for the reason that they appear in the accompanying drawings and/or in the detailed description.

A direct current power supply circuit according to the present disclosure can easily reduce power consumption of a switching power supply device upon especially a stand-by mode. Especially, the direct current power supply circuit is useful for a switching power supply device such as an AC-DC converter, DC-DC converter, or an external AC adapter, incorporated in various electronic devices.

What is claimed is:

1. A direct current power supply circuit comprising:
an alternating-current power supply;
a rectification circuit for rectifying an alternating-current signal of the alternating-current power supply to generate a direct-current voltage;
a first charging switch having a first input terminal connected to the rectification circuit, a first control terminal, and a first output terminal, the first charging switch outputting a first output voltage to the first output terminal according to a first input value input to the first control terminal;
a first capacitor and a first control circuit, which are connected to the first output terminal; and
a first charging switch control circuit connected to the first control terminal,
wherein:
the first charging switch control circuit generates a switch-on signal for turning on the first charging switch when the first output voltage is equal to or lower than a first reference voltage value, and generates a switch-off signal for turning off the first charging switch when the first output voltage is equal to or higher than a second reference voltage value higher than the first reference voltage value,
a charging period setting circuit, which includes at least one of the rectification circuit and the first charging switch control circuit, sets a charging period in which a charging current flows into the first capacitor through the first charging switch and a non-charging period in which the charging current does not flow, in synchronism with the alternating-current signal, and
in a case where the switch-on signal is generated during the charging period, the charging current flows through the first charging switch when the direct-current voltage becomes equal to or higher than the first output voltage, and in a case where the switch-on signal is generated during the non-charging period, the charging current does not flow through the first charging switch even if the direct-current voltage becomes equal to or higher than the first output voltage, while the charging current flows through the first charging switch when an operation enters a next charging period and yet the direct-current voltage becomes equal to or higher than the first output voltage.

2. The direct current power supply circuit according to claim 1, wherein:
the charging period setting circuit includes the rectification circuit constituted from a half-wave rectification circuit, and
one of a period in which the alternating-current signal has a positive value and a period in which the alternating-current signal has a negative value is set as the charging period, and a remaining period is set as the non-charging period.

3. The direct current power supply circuit according to claim 1, wherein
the charging period setting circuit includes:
the rectification circuit constituted from a full-wave rectification circuit; and
a charging inhibition signal generation circuit, which is connected to the alternating-current power supply, for generating a charging inhibition signal to control not to generate the switch-on signal, which is activated during a period in which the alternating-current signal has a positive value or a period in which the alternating-current signal has a negative value,
wherein:
the non-charging period is set when the charging inhibition signal is activated, and
the charging period is set when the charging inhibition signal is deactivated.

4. The direct current power supply circuit according to claim 3, wherein
the charging inhibition signal is generated from a signal acquired by applying a half-wave rectification to the alternating-current signal.

5. The direct current power supply circuit according to claim 1, wherein
the charging period setting circuit includes:
the rectification circuit constituted from a half-wave rectification circuit or a full-wave rectification circuit;
the first charging switch control circuit; and
a hysteresis control signal generation circuit, which is connected to the alternating-current power supply, for generating a hysteresis control signal which is activated during a predetermined period shorter than a cycle of the alternating-current power supply, when the direct-current voltage becomes equal to or lower than a predetermined voltage value which is equal to or lower than an average of absolute values of voltages of the alternating-current signal,
wherein:
a period during which the hysteresis control signal is activated is set to the charging period, and the first reference voltage value is changed to a third reference voltage value equal to or lower than the second reference voltage value, and
a period during which the hysteresis control signal is deactivated is set to the non-charging period, and the first output voltage does not become equal to or lower than the first reference voltage value.

6. The direct current power supply circuit according to claim 5, wherein
the hysteresis control signal is generated from a signal acquired by applying a half-wave rectification to the alternating-current signal.

7. The direct current power supply circuit according to claim 1, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

8. The direct current power supply circuit according to claim 2, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

9. The direct current power supply circuit according to claim 3, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

10. The direct current power supply circuit according to claim 4, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

11. The direct current power supply circuit according to claim 5, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

12. The direct current power supply circuit according to claim 6, wherein:
the first control circuit has operation modes including a normal power mode and a low-power mode, which are switched based on a mode switching signal, and
during a period in which the mode switching signal corresponds to the low-power mode, the first reference voltage value is changed to a fourth reference voltage value equal to or lower than the second reference voltage value.

13. The direct current power supply circuit according to claim 1, further comprising:
a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

14. The direct current power supply circuit according to claim 2, further comprising:

a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

15. The direct current power supply circuit according to claim 3, further comprising:

a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

16. The direct current power supply circuit according to claim 4, further comprising:

a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

17. The direct current power supply circuit according to claim 5, further comprising:

a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

18. The direct current power supply circuit according to claim 6, further comprising:

a second charging switch having a second input terminal connected to a rectification circuit, a second control terminal, and a second output terminal, the second charging switch outputting a second output voltage to the second output terminal according to a second input value input to the second control terminal;

a second capacitor and a second control circuit, which are connected to the second output terminal; and a second charging switch control circuit connected to the second control terminal, wherein:

the second control circuit has a normal power mode and a low-power mode, which are switched based on a mode switching signal, and during a period in which the mode switching signal corresponds to the low-power mode, the second control circuit inhibits the second charging switch from being turned on.

* * * * *